(12) United States Patent
Toshima et al.

(10) Patent No.: US 10,995,665 B2
(45) Date of Patent: May 4, 2021

(54) COMPRESSED AIR ENERGY STORAGE POWER GENERATION DEVICE AND COMPRESSED AIR ENERGY STORAGE POWER GENERATION METHOD

(71) Applicant: KOBE STEEL, LTD., Hyogo (JP)

(72) Inventors: Masatake Toshima, Kobe (JP); Haruyuki Matsuda, Kobe (JP); Yohei Kubo, Kobe (JP)

(73) Assignee: KOBE STEEL, LTD., Hyogo (JP)

( * ) Notice: Subject to any disclaimer, the term of this patent is extended or adjusted under 35 U.S.C. 154(b) by 0 days.

(21) Appl. No.: 16/605,656

(22) PCT Filed: Apr. 6, 2018

(86) PCT No.: PCT/JP2018/014721
§ 371 (c)(1),
(2) Date: Oct. 16, 2019

(87) PCT Pub. No.: WO2018/198724
PCT Pub. Date: Nov. 1, 2018

(65) Prior Publication Data
US 2020/0131989 A1 Apr. 30, 2020

(30) Foreign Application Priority Data
Apr. 26, 2017 (JP) .............................. JP2017-087531

(51) Int. Cl.
*F02C 6/16* (2006.01)
*F02C 6/18* (2006.01)

(52) U.S. Cl.
CPC . *F02C 6/16* (2013.01); *F02C 6/18* (2013.01)

(58) Field of Classification Search
CPC ...... F02C 6/16; F02C 6/18; F17C 1/00; F28D 1/00; F05D 2260/213; Y02E 60/16; H02J 15/006
See application file for complete search history.

(56) References Cited

U.S. PATENT DOCUMENTS 3,831,373 A * 8/1974 Flynt .................... F02C 6/16
60/802
4,275,310 A * 6/1981 Summers ................ F01K 21/04
290/1 R
(Continued)

FOREIGN PATENT DOCUMENTS

EP   3 358 167 A1   8/2018
FR   3 019 854 A1   10/2015
(Continued)

OTHER PUBLICATIONS

JP-2017008887-A English Translation (Year: 2017).*
(Continued)

*Primary Examiner* — Shafiq Mian
(74) *Attorney, Agent, or Firm* — Studebaker & Brackett PC

(57) ABSTRACT

A compressed air energy storage power generation device includes an inert gas source for supplying an inert gas, an inert gas flow path system, and a flow path switching unit. The inert gas flow path system fluidly connects the gas phase portion of the high temperature heat storage unit, the gas phase portion of the low temperature heat storage unit, and the inert gas source. The flow path switching unit switches the inert gas flow path system to at least a state in which the inert gas source is in communication with both the high temperature heat storage unit and the low temperature heat storage unit and a state in which the inert gas source is blocked from both the high temperature heat storage unit and the low temperature heat storage unit.

7 Claims, 16 Drawing Sheets

(56) References Cited

U.S. PATENT DOCUMENTS

| | | | | |
|---|---|---|---|---|
| 2005/0271917 A1* | 12/2005 | Hoffjann | ........... | H01M 8/04007 |
| | | | | 429/414 |
| 2011/0127004 A1* | 6/2011 | Freund | ...................... | F02C 6/16 |
| | | | | 165/45 |
| 2016/0216044 A1* | 7/2016 | Narine | ...................... | F02C 6/16 |
| 2018/0283275 A1 | 10/2018 | Matsukuma et al. | | |
| 2018/0313270 A1* | 11/2018 | Jones | ...................... | F01D 25/12 |

FOREIGN PATENT DOCUMENTS

| | | | |
|---|---|---|---|
| JP | 2016-211436 A | | 12/2016 |
| JP | 2017008887 A | * | 1/2017 |
| WO | 2017057144 A1 | | 4/2017 |

OTHER PUBLICATIONS

The extended European search report issued by the European Patent Office dated Jan. 13, 2021, which corresponds to European Patent Application No. 18792057.4 and is related to U.S. Appl. No. 16/605,656.

* cited by examiner

COMPRESSED AIR ENERGY STORAGE POWER GENERATION DEVICE AND COMPRESSED AIR ENERGY STORAGE POWER GENERATION METHOD

CROSS-REFERENCE TO RELATED APPLICATIONS

This is a national phase application in the United States of International Patent Application No. PCT/JP2018/014721 with an international filing date of Apr. 6, 2018, which claims priority of Japanese Patent Application No. 2017-087531 filed on Apr. 26, 2017 the contents of which are incorporated herein by reference.

TECHNICAL FIELD

The present invention relates to a compressed air energy storage power generation device and a compressed air energy storage power generation method.

BACKGROUND ART

Compressed air energy storage (CAES) has been known as one of techniques for smoothing or equalizing fluctuating unstable power generation output. In a compressed air energy storage power generation device to which this technique is applied, when excess power is generated, a compressor generates compressed air to store energy as air pressure in advance, and when necessary, an expander operates to convert the compressed air back to electricity with a generator.

The compressed air energy storage power generation device disclosed in JP 2016-211436 A is provided with a heat medium flow path including a first heat exchanger, a high temperature heat medium tank, a second heat exchanger, and a low temperature heat medium tank. The compressed air discharged from a compressor is heat-recovered by heat exchange with a heat medium in the first heat exchanger, and then stored in a pressure accumulation tank. The heat medium raised in temperature by heat recovery is collected in the high temperature heat medium tank. The compressed air stored in the pressure accumulation tank is supplied to the expander after being heated by heat exchange with a heat medium in the second heat exchanger. The heat medium lowered in temperature by heat exchange is collected in the low temperature heat medium tank. The heat medium flow path is provided with a pump for circulating a heat medium.

SUMMARY OF THE INVENTION

Problems to be Solved by the Invention

Prior art documents relating to the compressed air energy storage power generation device, including JP 2016-211436 A, do not include any particular teaching on the suppression of deterioration of a heat medium.

An object of the present invention is to suppress deterioration of a heat medium in a compressed air energy storage power generation device.

Means for Solving the Problems

According to a first aspect of the present invention, there is provided a compressed air energy storage power generation device including: an electric motor driven by fluctuating input power; a compressor that is mechanically connected to the electric motor and compresses air; an accumulator that is fluidly connected to the compressor and stores compressed air generated by the compressor; an expander that is fluidly connected to the accumulator and driven by the compressed air supplied from the accumulator; a generator that is mechanically connected to the expander; a first heat exchange unit that performs a heat exchange between the compressed air generated by the compressor and a heat medium to raise a temperature of the heat medium; a high temperature heat storage unit that is fluidly connected to the first heat exchange unit and stores the heat medium after the heat exchange in the first heat exchange unit; a second heat exchange unit that is fluidly connected to the high temperature heat storage unit and performs a heat exchange between the heat medium supplied from the high temperature heat storage unit and the compressed air supplied from the accumulator to the expander to raise a temperature of the compressed air; a low temperature heat storage unit that is fluidly connected to the second heat exchange unit and stores a heat medium after the heat exchange in the second heat exchange unit; an inert gas source that supplies an inert gas; an inert gas flow path system through which a gas phase portion of the high temperature heat storage unit, a gas phase portion of the low temperature heat storage unit, and the inert gas source are fluidly connected to each other; and a flow path switching unit that switches the inert gas flow path system to at least a state in which the inert gas source is in communication with both the high temperature heat storage unit and the low temperature heat storage unit and a state in which the inert gas source is blocked from both the high temperature heat storage unit and the low temperature heat storage unit.

The inert gas is supplied from the inert gas source to the high temperature heat storage unit and the low temperature heat storage unit through the inert gas flow path system, so that the oxidation deterioration of the heat medium stored in these tanks can be suppressed or prevented. Further, the gas phase portion of the high temperature heat storage unit and the gas phase portion of the low temperature heat storage unit are fluidly connected to each other through the inert gas flow path system. That is, the inert gas can move between the high temperature heat storage unit and the low temperature heat storage unit through the inert gas flow path system. Therefore, the amount of the inert gas to be newly supplied from the inert gas source to the high temperature heat storage unit and the low temperature heat storage unit, that is, the amount of inert gas consumption can be reduced.

Specifically, the compressed air energy storage power generation device further includes a control unit that controls the flow path switching unit, and a state of the inert gas flow path system that is switchable by the flow path switching unit includes: a first state in which the high temperature heat storage unit and the low temperature heat storage unit communicate with each other, and the inert gas source is blocked from both the high temperature heat storage unit and the low temperature heat storage unit; a second state in which the high temperature heat storage unit and the low temperature heat storage unit are blocked from each other, and the inert gas source is blocked from both the high temperature heat storage unit and the low temperature heat storage unit; a third state in which the inert gas source is in communication with the low temperature heat storage unit, and the high temperature heat storage unit is blocked from the low temperature heat storage unit and the inert gas source; and a fourth state in which the inert gas source is in communication with the high temperature heat storage unit, and the low temperature heat storage unit is blocked from the high temperature heat storage unit and the inert gas source, and the control unit causes the flow path switching unit to switch the inert gas flow path system to any one of the first to fourth states based on at least either during a charging operation or during a power generation operation, and whether a first pressure which is a pressure of the gas phase portion of the high temperature heat storage unit is equal to or higher than a second pressure which is a pressure of the gas phase portion of the low temperature heat storage unit.

More specifically, it is possible to set a first mode in which inert gas consumption reduction is prioritized over power consumption reduction, and a second mode in which the power consumption reduction is prioritized over the inert gas consumption reduction, when the first pressure is equal to or higher than the second pressure during the charging operation in the first mode, the control unit causes the flow path switching unit to set the inert gas flow path to the first state, and when the first pressure is not equal to or higher than the second pressure during the charging operation in the first mode, the control unit causes the flow path switching unit to set the inert gas flow path to the second state, and during the charging operation in the second mode, the control unit causes the flow path switching unit to switch the inert gas flow path to the third state.

Since the control unit causes the flow path switching unit to switch the inert gas flow path system in this manner, the inert gas consumption can be reduced during the charging operation in the first mode, and during the charging operation in the second mode, the power consumption of the compressed air energy storage power generation device can be reduced.

In addition, when the first pressure is equal to or higher than the second pressure during the power generation operation in the first mode, the control unit causes the flow path switching unit to set the inert gas flow path to the second state, and when the first pressure is not equal to or higher than the second pressure during the power generation operation in the first mode, the control unit causes the flow path switching unit to set the inert gas flow path to the first state, and during the power generation operation in the second mode, the control unit causes the flow path switching unit to switch the inert gas flow path to the fourth state.

Since the control unit causes the flow path switching unit to switch the inert gas flow path in this manner, the inert gas consumption can be reduced during the power generation operation in the first mode, and during the power generation operation in the second mode, the power consumption of the compressed air energy storage power generation device can be reduced.

Alternatively, when the first pressure is equal to or higher than the second pressure during the charging operation, the control unit may cause the flow path switching unit to switch the inert gas flow path to the first state, and when the first pressure is not equal to or higher than the second pressure, the control unit may cause the flow path switching unit to switch the inert gas flow path to the second state.

Further, when the first pressure is equal to or higher than the second pressure during the power generation operation, the control unit may cause the flow path switching unit to switch the inert gas flow path to the second state, and when the pressure is not equal to or higher than the second pressure during the power generation operation, the control unit may cause the flow path switching unit to switch the inert gas flow path to the first state.

According to a second aspect of the present invention, there is provided a compressed air energy storage power generation method including: preparing a compressed air energy storage power generation device including an electric motor driven by fluctuating input power, a compressor that is mechanically connected to the electric motor and compresses air, an accumulator that is fluidly connected to the compressor and stores compressed air generated by the compressor, an expander that is fluidly connected to the accumulator and driven by the compressed air supplied from the accumulator, a generator that is mechanically connected to the expander, a first heat exchange unit that performs a heat exchange between the compressed air generated by the compressor and a heat medium to raise a temperature of the heat medium, a high temperature heat storage unit that is fluidly connected to the first heat exchange unit and stores the heat medium after the heat exchange in the first heat exchange unit, a second heat exchange unit that is fluidly connected to the high temperature heat storage unit and performs a heat exchange between the heat medium supplied from the high temperature heat storage unit and the compressed air supplied from the accumulator to the expander to raise a temperature of the compressed air, a low temperature heat storage unit that is fluidly connected to the second heat exchange unit and stores a heat medium after the heat exchange in the second heat exchange unit, an inert gas source that supplies an inert gas, an inert gas flow path system through which a gas phase portion of the high temperature heat storage unit, a gas phase portion of the low temperature heat storage unit, and the inert gas source are fluidly connected to each other, and a flow path switching unit that switches the inert gas flow path system to a communication state and a blocked state; including a state of the inert gas flow path system that is switchable by the flow path switching unit, the state including a first state in which the high temperature heat storage unit and the low temperature heat storage unit communicate with each other, and the inert gas source is blocked from both the high temperature heat storage unit and the low temperature heat storage unit, a second state in which the high temperature heat storage unit and the low temperature heat storage unit are blocked from each other, and the inert gas source is blocked from both the high temperature heat storage unit and the low temperature heat storage unit, a third state in which the inert gas source is in communication with the low temperature heat storage unit, and the high temperature heat storage unit is blocked from the low temperature heat storage unit and the inert gas source, and a fourth state in which the inert gas source is in communication with the high temperature heat storage unit, and the low temperature heat storage unit is blocked from the high temperature heat storage unit and the inert gas source; and switching the inert gas flow path system to any one of the first to fourth states based on at least either during a charging operation or during a power generation operation, and whether a first pressure which is a pressure of the gas phase portion of the high temperature heat storage unit is equal to or higher than a second pressure which is a pressure of the gas phase portion of the low temperature heat storage unit.

According to the present invention, it is possible to suppress deterioration of a heat medium in a compressed air energy storage power generation device.

DESCRIPTION OF EMBODIMENTS

First Embodiment

A compressed air energy storage (CAES) power generation device 1 equalizes output fluctuation of a power generation device 2 that generates electric power using renewable energy to supply power to a power system 3, and also supplies the power in accordance to the fluctuation of the power demand to the power system 3.

Figure 1:
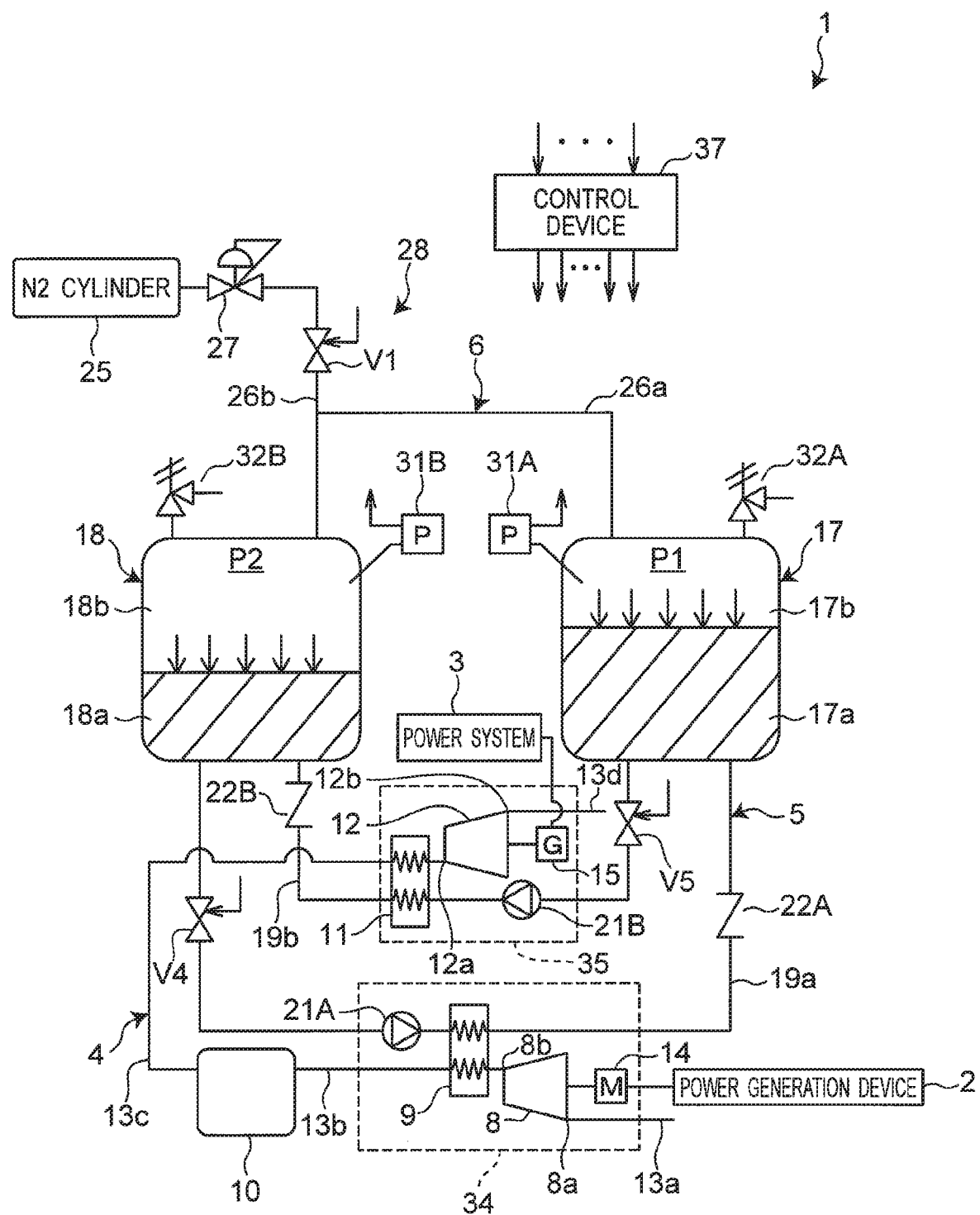
FIG. 1 is a schematic configuration diagram of a compressed air energy storage power generation device according to a first embodiment of the present invention.

Referring to FIG. 1, the CAES power generation device 1 of the present embodiment is provided with an air flow path system 4, a heat medium flow path system 5, and an inert gas flow path system 6.

(Air Flow Path System)

The air flow path system 4 is provided with a compressor 8, a first heat exchanger (first heat exchange unit) 9, a pressure accumulation tank (accumulator) 10, a second heat exchanger (second heat exchange unit) 11, and an expander 12. The air flow path system 4 includes is provided with air flow paths 13a to 13d.

An electric motor 14 is mechanically connected to the compressor 8. The power generation device 2 is electrically connected to the electric motor 14. The power generation device 2 generates electric power by renewable energies such as wind power, sunlight, solar heat, and wave power. The electric motor 14 is driven by the fluctuating input power from the power generation device 2. The electric power may be supplied to the electric motor 14 from a power system. A suction port 8a of the compressor 8 is fluidly connected to the air flow path 13a for suction. A discharge port 8b of the compressor 8 is fluidly connected to the pressure accumulation tank 10 through the air flow path 13b. The first heat exchanger 9 is provided in the air flow path 13b.

The compressor 8 of the present embodiment is a screw type. The screw-type compressor 8 can control the number of rotations to respond to irregularly fluctuating input power with high responsiveness and thus is preferable as a component of the CAES power generation device 1. The compressor 8 may be a scroll type, a turbo type, or a reciprocating type in addition to the screw type.

The pressure accumulation tank 10 can store compressed air and accumulate as energy. The pressure accumulation tank 10 is fluidly connected to an air supply port 12a of the expander 12 by the air flow path 13c. The second heat exchanger 11 is provided in the air flow path 13c.

A generator 15 is mechanically connected to the expander 12. The generator 15 is electrically connected to the power system 3. An air exhaust port 12b of the expander 12 is fluidly connected to the air flow path 13d for exhaust.

The expander 12 of the present embodiment is a screw type. The screw-type expander 12 can control the number of rotations, and thus is preferable as a component of the CAES power generation device 1. The expander 12 may be a scroll type, a turbo type, or a reciprocating type in addition to the screw type.

(Heat Medium Flow Path System)

In the heat medium flow path system 5, the first heat exchanger 9, a high temperature heat medium tank (high temperature heat storage unit) 17, a second heat exchanger 11, and a low temperature heat medium tank (low temperature heat storage unit) 18 are provided in order. The heat medium flow path system 5 includes heat medium flow paths 19a and 19b. A liquid heat medium circulates through the heat medium flow path system 5 by pumps 21A and 21B described later. The type of the heat medium is not particularly limited, but, for example, a mineral oil type, glycol type or synthetic oil type heat medium can be used.

A portion (liquid phase portion 17a) where the heat medium is stored, and a gas phase portion 17b filled with N2 gas (inert gas) without storing the heat medium are provided in the high temperature heat medium tank 17. Similarly, a liquid phase portion 18a in which the heat medium is stored and a gas phase portion 18b filled with N2 gas are provided in the low temperature heat medium tank 18.

The heat medium flow path 19a fluidly connects the liquid phase portion 17a of the high temperature heat medium tank 17 and the liquid phase portion 18a of the low temperature heat medium tank 18. In the heat medium flow path 19a, the heat medium flows from the low temperature heat medium tank 18 to the high temperature heat medium tank 17 as described in detail later. The first heat exchanger 9 is provided in the heat medium flow path 19a. The heat medium flow path 19a is provided with a valve V4 that can be controlled to be opened and closed by a control device 37, which will be described later, and a pump 21A between the low temperature heat medium tank 18 and the first heat exchanger 9. Further, the heat medium flow path 19a is provided with a check valve 22A between the first heat exchanger 9 and the high temperature heat medium tank 17. The check valve 22A allows the flow of the heat medium toward the high temperature heat medium tank 17, but blocks the flow of the heat medium in the opposite direction.

The heat medium flow path 19b fluidly connects the liquid phase portion 17a of the high temperature heat medium tank 17 and the liquid phase portion 18a of the low temperature heat medium tank 18. In the heat medium flow path 19b, the heat medium flows from the high temperature heat medium tank 17 to the low temperature heat medium tank 18 as described in detail later. The second heat exchanger 11 is provided in the heat medium flow path 19b. The heat medium flow path 19b is provided with a valve V5 that can be controlled to be opened and closed and a pump 21B between the high temperature heat medium tank 17 and the second heat exchanger 11. Further, the heat medium flow path 19b is provided with a check valve 22B between the second heat exchanger 11 and the low temperature heat medium tank 18. The check valve 22B allows the flow of the heat medium toward the low temperature heat medium tank 18, but blocks the flow of the heat medium in the opposite direction.

(Inert Gas Flow Path System)

The inert gas flow path system 6 fluidly connects the gas phase portion 17b of the high temperature heat medium tank 17, the gas phase portion 18b of the low temperature heat medium tank 18, and an N2 cylinder (inert gas source) 25 to each other. Instead of the N2 cylinder 25, an inert gas source that supplies an inert gas other than N2 such as Ar may be employed.

The inert gas flow path system 6 in the present embodiment is provided with an inert gas flow path 26a that fluidly communicates the gas phase portion 17b of the high temperature heat medium tank 17 and the gas phase portion 18b of the low temperature heat medium tank 18. Further, the inert gas flow path system 6 is provided with an inert gas flow path 26b that fluidly connects the inert gas flow path 26a and the N2 cylinder 25. The inert gas flow path 26b is provided with a pressure reducing valve 27 for reducing the pressure supplied from the N2 cylinder 25 to a predetermined pressure.

A flow path switching unit 28 is provided to switch a communication state of the inert gas flow path system 6. In the present embodiment, the flow path switching unit 28 is configured to include a single valve V1 that can be controlled to be opened and closed. The valve V1 is provided in the inert gas flow path 26b on the inert gas flow path 26a side of the pressure reducing valve 27.

The high temperature heat medium tank 17 is provided with a pressure sensor 31A for detecting the pressure of the gas phase portion 17b, that is, a pressure P1 of the filled N2 gas. Further, the high temperature heat medium tank 17 is provided with a safety valve 32A that is opened in a case where the pressure P1 exceeds a threshold value to discharge the N2 gas of the gas phase portion 17b to the outside. Similarly, the low temperature heat medium tank 18 is provided with a pressure sensor 31B for detecting the pressure of the gas phase portion 18b, that is, a pressure P2 of the filled N2 gas, and a safety valve 32B.

Since N2 is supplied from the N2 cylinder 25 to the high temperature heat medium tank 17 and the low temperature heat medium tank 18 through the inert gas flow paths 26a and 26b, the oxidation deterioration of the heat medium stored in these tanks can be suppressed or prevented.

(Compressor Unit)

The compressor 8, the electric motor 14, the first heat exchanger 9, and the pump 21A constitute a compressor unit 34. The compressor unit 34 may be a multistage compressor including a plurality of compressors and may include a plurality of first heat exchangers.

(Generator Unit)

The expander 12, the generator 15, the second heat exchanger 11, and the pump 21B constitute a generator unit 35. The generator unit 35 may be a multistage type including a plurality of expanders and may include a plurality of second heat exchangers.

(Control Device)

A control device causes the CAES power generation device 1 to control various components in an integrated manner based on various inputs (for example, the pressures P1 and P2 detected by the pressure sensors 31A and 31B). Such components include the electric motor 14 for driving the compressor 8, the pumps 21A and 21B, and the valves V1, V4, and V5. The control device 37 is constructed by hardware including a storage device such as a central processing unit (CPU), a random access memory (RAM), and a read only memory (ROM), and software implemented thereon.

(Charging Operation)

At the time of a charging operation, the pump 21A is operated and the pump 21B is not operated. In addition, the valve V4 is opened, but the valve V5 is closed.

At the time of the charging operation, the electric motor 14 is driven by the fluctuating power input from the power generation device 2, and the compressor 8 is driven by the electric motor 14. The compressor 8 suctions air supplied through the air flow path 13a from the suction port 8a and compresses the air to generate compressed air. The compressed air discharged from the discharge port 8b of the compressor 8 is pressure-fed to the pressure accumulation tank 10 through the air flow path 13b and stored in the pressure accumulation tank 10. That is, the pressure accumulation tank 10 stores compressed air and accumulates as energy. The compressed air passes through the first heat exchanger 9 before being pressure-fed to the pressure accumulation tank 10.

At the time of the charging operation, the heat medium stored in the low temperature heat medium tank 18 is sent to the high temperature heat medium tank 17 through the heat medium flow path 19a by the pump 21A. The heat medium passes through the first heat exchanger 9 before being sent to the high temperature heat medium tank 17.

The compressed air discharged from the discharge port 8b of the compressor 8 has a high temperature due to the compression heat generated at the time of the compression. In the first heat exchanger 9, the compressed air is cooled and the heat medium is heated by the heat exchange between the heat medium and the compressed air. Therefore, the compressed air lowered in temperature by heat exchange in the first heat exchanger 9 is stored in the pressure accumulation tank 10. Further, the high temperature heat medium tank 17 stores the heat medium raised in temperature after the heat exchange in the first heat exchanger 9.

(Power Generation Operation)

At the time of a power generation operation, the pump 21B is operated, but the pump 21A is not operated. In addition, the valve V5 is opened, but the valve V4 is closed.

At the time of the power generation operation, the compressed air sent from the pressure accumulation tank 10 is supplied to the air supply port 12a of the expander 12 through the air flow path 13c. The compressed air passes through the second heat exchanger 11 before being supplied to the expander 12. The expander 12 is operated by the compressed air supplied to the air supply port 12a to drive the generator 15. The electric power generated by the generator 15 is supplied to the power system 3. The air expanded by the expander 12 is exhausted from the air exhaust port 12b through the air flow path 13d.

At the time of the power generation operation, the heat medium stored in the high temperature heat medium tank 17 is sent to the low temperature heat medium tank 18 through the heat medium flow path 19b by the pump 21B. The heat medium passes through the second heat exchanger 11 before being sent to the high temperature heat medium tank 17.

In the expander 12, the temperature of the air is decreased due to heat absorption at the time of expansion. Therefore, the compressed air supplied to the expander 12 is preferably at a high temperature. In the second heat exchanger 11, the compressed air is heated and the heat medium is cooled by the heat exchange between the heat medium and the compressed air. Therefore, the compressed air raised in temperature by heat exchange in the second heat exchanger 11 is supplied to the expander 12. Further, the low temperature heat medium tank 18 stores the heat medium lowered in temperature after the heat exchange in the second heat exchanger 11.

(N2 Gas Filling Control)

Hereinafter, a control of opening and closing the valve V1 constituting the flow path switching unit 28 will be described. The control device 37 controls the valve V1 based on the pressures P1 and P2 of the gas phase portions 17b and 18b of the high temperature heat medium tank 17 and the low temperature heat medium tank 18, which are detected by the pressure sensors 31A and 31B. The valve V1 may be controlled based only on the pressure detected by one of the pressure sensors 31A and 31B. In the second and third embodiments described later, the control of the flow path switching unit 28 is differently performed during the charging operation and the power generation operation, but in the present embodiment, the control of opening and closing the valve V1 is not differently performed during the charging operation and the power generation operation.

The control device 37 opens and closes the valve V1 based on the comparison result of the pressures P1 and P2 of the gas phase portions 17b and 18b with a predetermined threshold value. This threshold value corresponds to the minimum value of N2 gas with which the high temperature heat medium tank 17 and the low temperature heat medium tank 18 need to be filled.

If the pressures P1 and P2 of the gas phase portions 17b and 18b are equal to or higher than the threshold value, the valve V1 is maintained in a closed state. Even when the valve V1 is closed, the gas phase portion 17b of the high temperature heat medium tank 17 and the gas phase portion 18b of the low temperature heat medium tank 18 are in fluid communication with each other through the inert gas flow path 26a.

When the pressures P1 and P2 of the gas phase portions 17b and 18b are lower than the threshold value, the valve V1 is opened. When the valve V1 is opened, the N2 gas is supplied from the N2 cylinder 25 to the high temperature heat medium tank 17 and the low temperature heat medium tank 18 through the inert gas flow paths 26a and 26b.

During the charging operation, the heat medium flows to the high temperature heat medium tank 17 through the heat medium flow path 19a by the pump 21A. On the other hand, during the power generation operation, the heat medium flows to the low temperature heat medium tank 18 through the heat medium flow path 19b by the pump 21B. Generally, the charging operation time is longer than the power generation operation time because of the relationship between charge and discharge efficiency. Due to the difference in operating time, the amount of the heat medium stored in the high temperature heat medium tank 17 tends to increase more than the amount of the heat medium stored in the low temperature heat storage tank 18.

The heat medium stored in the high temperature heat medium tank 17 is raised in temperature by the heat recovery from the compressed air in the first heat exchanger 9. Therefore, the heat medium in the high temperature heat medium tank 17 tends to thermally expand.

Due to the above two tendencies, the rise of the liquid level of the heat medium in the high temperature heat medium tank 17 is more significant than the rise of the liquid level of the heat medium in the low temperature heat medium tank 18. In other words, the volume of the gas phase portion 17b of the high temperature heat medium tank 17 relatively decreases, and the volume of the gas phase portion 18b of the low temperature heat medium tank 18 tends to relatively increase. Even when the valve V1 is closed, the gas phase portion 17b of the high temperature heat medium tank 17 and the gas phase portion 18b of the low temperature heat medium tank 18 are fluidly connected to each other through the inert gas flow path 26a. That is, the inert gas can move between the high temperature heat medium tank 17 and the low temperature heat medium tank 18 through the inert gas flow path 26a, and thus the gas phase portion 17b of the high temperature heat medium tank 17 and the gas phase portion 18b of the low temperature heat medium tank 18 are pressure equalized. Therefore, the amount of the inert gas newly supplied from the N2 cylinder 25 to the high temperature heat medium tank 17 and the low temperature heat medium tank 18, that is, the amount of the inert gas consumption can be reduced. Further, the entire pressure level of the heat medium flow path system 5 including the high temperature heat medium tank 17 and the low temperature heat medium tank 18 in addition to the inert gas flow path system 6 can be made uniform.

Second Embodiment

Figure 2:
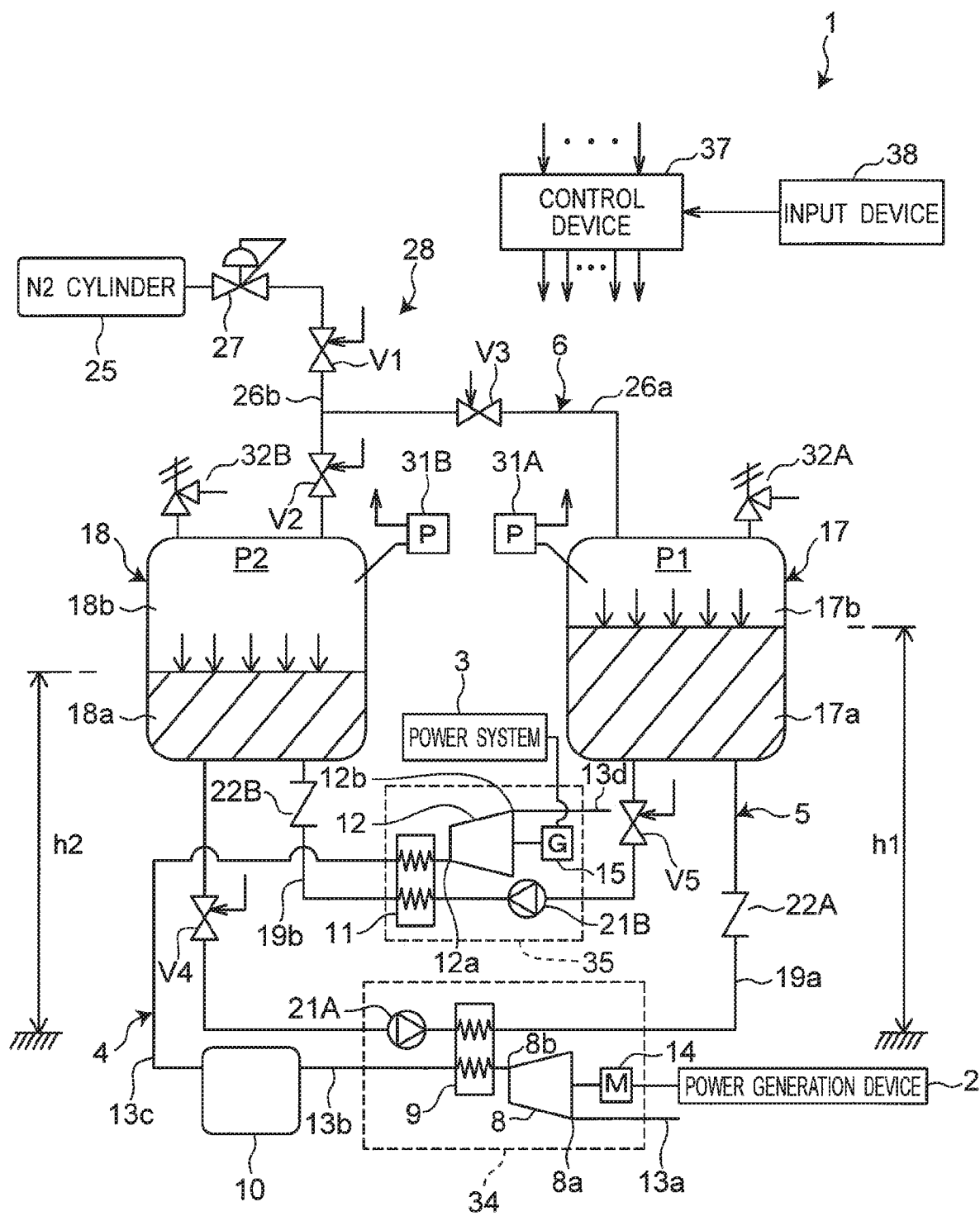
FIG. 2 is a schematic configuration diagram of a compressed air energy storage power generation device according to a second embodiment of the present invention.

Referring to FIG. 2, the device configuration of the CAES power generation device 1 according to the second embodiment of the present invention is different from that of the first embodiment in the following points. Other device configurations of the present embodiment are the same as those of the first embodiment, and the same or similar components as or to those of the first embodiment are designated by the same reference numerals.

The flow path switching unit 28 includes, in addition to the valve V1 provided in the inert gas flow path 26b, two valves V2 and V3 provided in the inert gas flow path 26a. These valves V2 and V3 are valves that can be controlled to be opened and closed by the control device 37 similar to the valve V1. The valve V2 is disposed between the valve V1 and the low temperature heat medium tank 18, that is, on the inlet side of the low temperature heat medium tank 18. The valve V3 is disposed between the valve V1 and the high temperature heat medium tank 17, that is, on the inlet side of the high temperature heat medium tank 17.

As long as switching of the communication state of the inert gas flow path system 6 (inert gas flow paths 26a and 26b) can be realized by the control of opening and closing the valves V1 to V3 described later, the flow path switching unit 28 may be configured to include a single valve (for example, a three-port four-position valve) or may be configured to include two valves. Further, the configuration of the flow path of the inert gas flow path system 6 is not limited to that illustrated in FIG. 2 as long as the necessary switching of the communication state can be realized.

The CAES power generation device 1 of the present embodiment includes an input device 38 communicably connected to the control device 37. The input device 38 receives an input of a command from an operator, and sends the input command to the control device 37. The input device 38 may be communicably connected to the control device 37 through a communication network. The command sent from the input device 38 to the control device 37 includes an instruction whether or not to set two types of modes. The two types of modes are a N2 consumption reduction priority mode (first mode) and a power consumption reduction priority mode (second mode).

In the N2 consumption reduction priority mode, the reduction of the supply amount of N2 gas from the N2 cylinder 25 to the high temperature heat medium tank 17 and the low temperature heat medium tank 18, that is, the reduction of the consumption of N2 gas is prioritized over the reduction of the power consumption of the CAES power generation device 1. In the power consumption reduction priority mode, the power consumption reduction of the CAES power generation device 1 is prioritized over the consumption reduction of N2 gas.

The control device 37 of the present embodiment controls open and close states of the three valves V1 to V3 constituting the flow path switching unit 28 based on the following, and thereby the inert gas flow paths 26a and 26b constituting the inert gas flow path system 6 is switched to the communication state.

Whether the CAES power generation device 1 is performing the charging operation or the power generation operation.

Whether it is set to the N2 consumption reduction priority mode or the power consumption reduction priority mode.

Whether or not the pressure P1 of the gas phase portion 17b of the high temperature heat medium tank 17 detected by the pressure sensor 31A is equal to or higher than the pressure P2 of the gas phase portion 18b of the low temperature heat medium tank 18 detected by the pressure sensor 31B.

Since the heat medium flows from the low temperature heat medium tank 18 to the high temperature heat medium tank 17 through the heat medium flow path 19a by the pump 21A during the charging operation of the CAES power generation device 1, the valve V4 is set to be opened. Further, during the charging operation of the CAES power generation device 1, the pump 21B is stopped, the heat medium does not flow in the heat medium flow path 19b, and the valve V5 is set to be closed.

Since the heat medium flows from the high temperature heat medium tank 17 to the low temperature heat medium tank 18 through the heat medium flow path 19b by the pump 21B during the power generation operation of the CAES power generation device 1, the valve V5 is set opened. Further, during the charging operation of the CAES power generation device 1, the pump 21A is stopped, the heat medium does not flow in the heat medium flow path 19a, and the valve V4 is set to be closed.

Hereinafter, control of the flow path switching unit 28 (valves V1 to V3) by the control device 37 will be described with further reference to FIGS. 3 to 12. In the following description, the liquid level of the heat medium of the high temperature heat medium tank 17 is indicated by a symbol h1, and the liquid level of the heat medium of the low temperature heat medium tank 18 is indicated by a symbol h2. Further, a density of the heat medium is indicated by a symbol $\rho$, a gravitational acceleration is indicated by a symbol g, and a piping pressure loss of the heat medium flow path system 5 is indicated by a symbol $\Delta PLc$.

(Control During Charging Operation)

Figure 3:
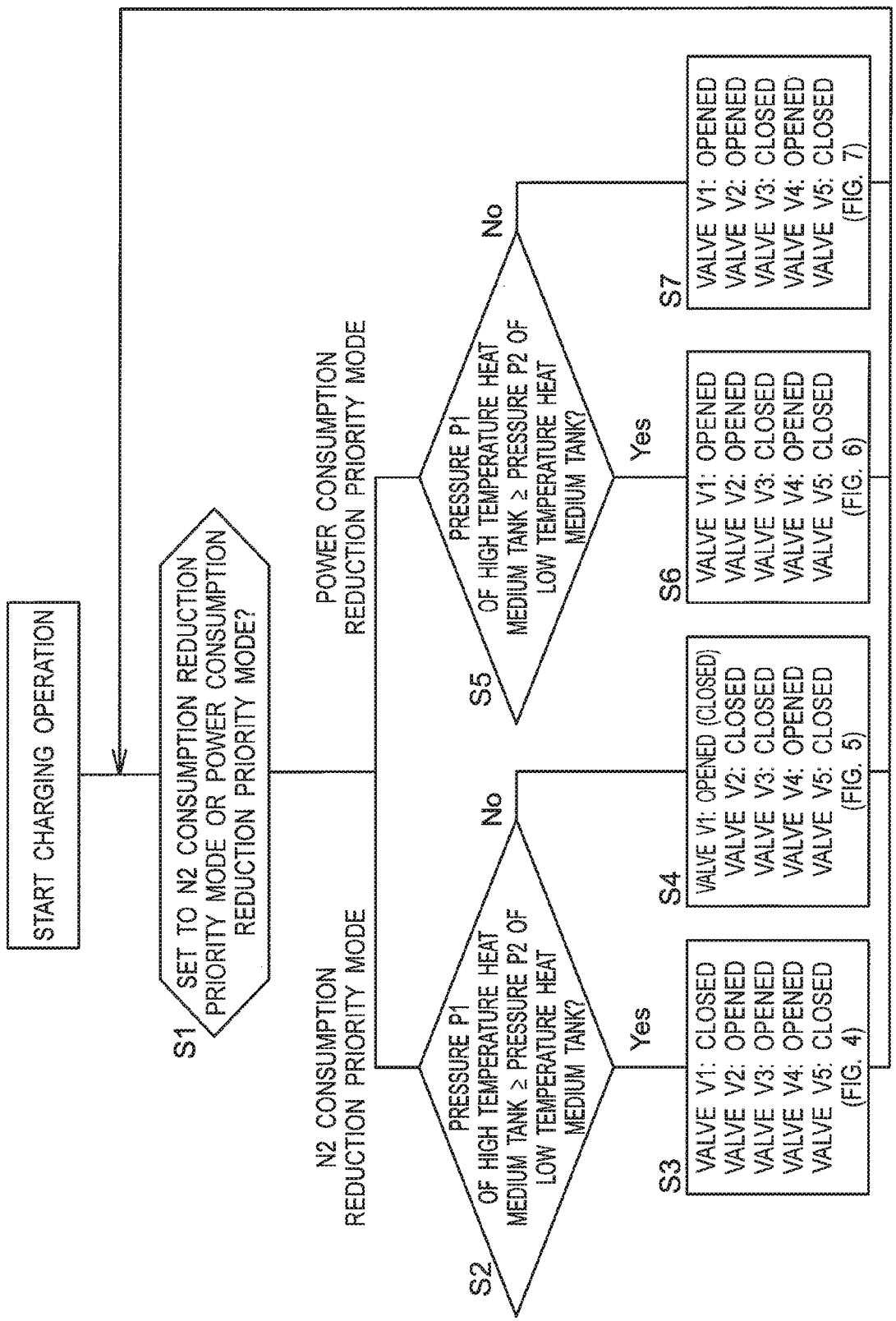
FIG. 3 is a flowchart for describing the switching of a valve at the time of a charging operation in the second embodiment.

Referring to FIG. 3, in step S1, it is determined whether it is set to the N2 consumption reduction priority mode or the power consumption reduction priority mode. If the N2 consumption reduction priority mode is set, the process proceeds to step S2, and if the power consumption reduction priority mode is set, the process proceeds to step S5.

In step S2, it is determined whether or not the pressure P1 of the gas phase portion 17b of the high temperature heat medium tank 17 detected by the pressure sensor 31A is equal to or higher than the pressure P2 of the gas phase portion 18b of the low temperature heat medium tank 18 detected by the pressure sensor 31B.

If the pressure P1 is equal to or higher than the pressure P2 in step S2, the process proceeds to step S3.

Figure 4:
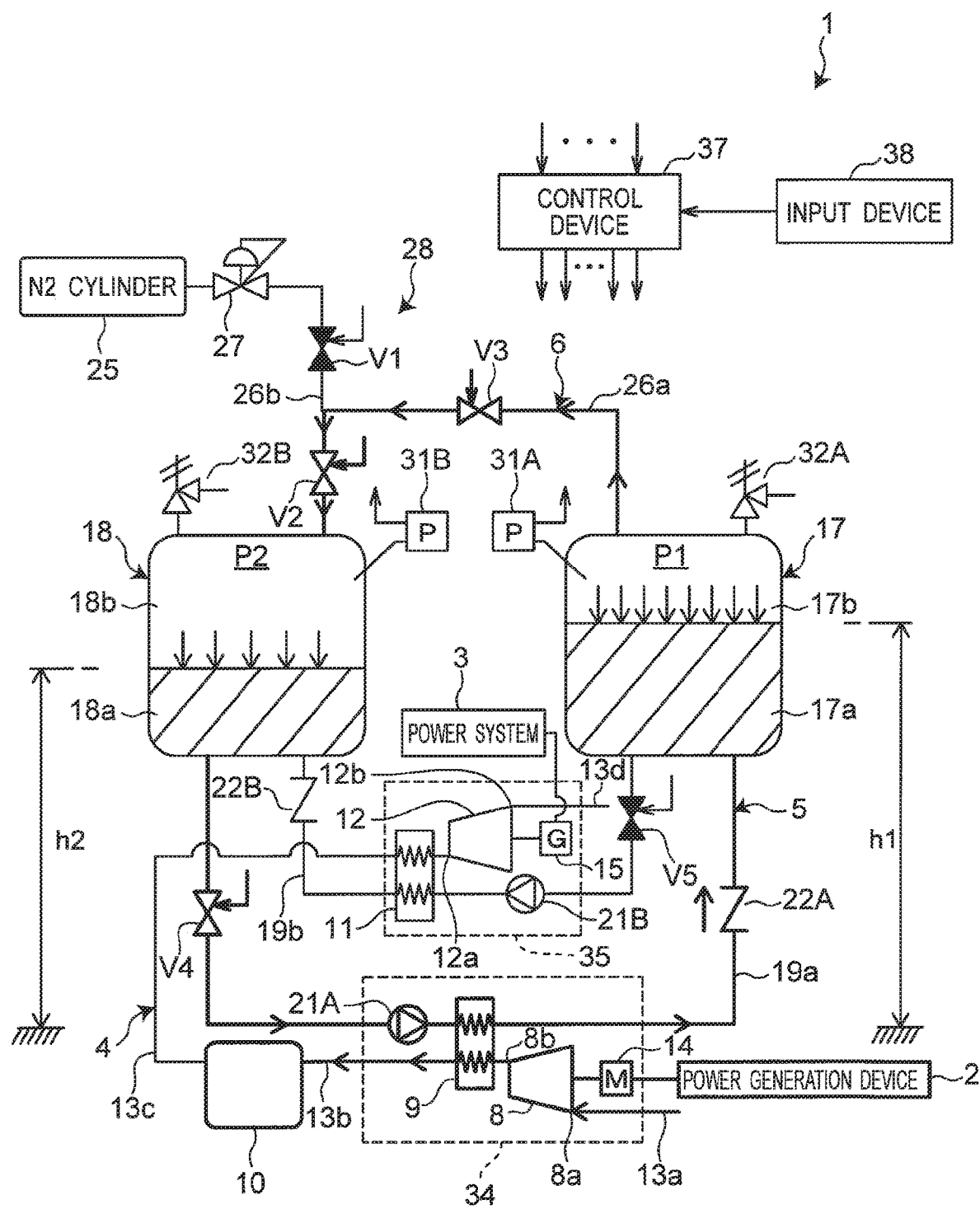
FIG. 4 is a schematic configuration diagram illustrating a setting of opening and closing of the valve at the time of the charging operation (N2 consumption reduction priority, P1≥P2)

Step S3 is a case where during the charging operation in the N2 consumption reduction priority mode, the pressure P1 of the gas phase portion 17b of the high temperature heat medium tank 17 is equal to or higher than the pressure P2 of the gas phase portion 18b of the low temperature heat medium tank 18. Referring also to FIG. 4, in step S3, the valve V1 is set to be closed, and the valves V2 and V3 are set to be open. By setting the valves V1 to V3 to be opened and closed, the high temperature heat medium tank 17 and the low temperature heat medium tank 18 communicate with each other through the inert gas flow path 26a. Further, the N2 cylinder 25 is blocked from both the high temperature heat medium tank 17 and the low temperature heat medium tank 18 (first state).

By setting the valves V1 to V3 to be opened or closed as illustrated in FIG. 4, the N2 gas in the gas phase portion 17b of the high temperature heat medium tank 17 moves to the gas phase portion 18b of the low temperature heat medium tank 18 through the inert gas flow path 26a until the pressure P1 of the high temperature heat medium tank 17 becomes equal to the pressure P2 of the low temperature heat medium tank 18 (P1=P2). That is, due to the movement of the N2 gas through the inert gas flow path 26a, the gas phase portion 17b of the high temperature heat medium tank 17 and the gas phase portion 18b of the low temperature heat medium tank 18 are equalized. Due to the movement of the N2 gas, the pressure P2 of the low temperature heat medium tank 18 increases, and the pressure P2 of the high temperature heat medium tank 17 decreases. Therefore, the total head $\Delta P$ of the pump 21A decreases by the pressure increase (P1−P2) necessary in a case where the gas phase portion 17b of the high temperature heat medium tank 17 and the gas phase portion 18b of the low temperature heat medium tank 18 do not communicate with each other. That is, the power consumption of the pump 21A is reduced by the pressure increase (P1−P2). The total head ΔP of the pump 21A is represented by the following Expression (1).

[Expression 1]

$$\Delta P = \rho g(h1-h2) + \Delta PLc \quad (1)$$

ΔP: Total head of pump
ρ: Density of heat medium
g: Gravitational acceleration
h1: Liquid level of heat medium of high temperature heat medium tank
h2: Liquid level of heat medium of low temperature heat medium tank 18
ΔPLc: Piping pressure loss The liquid level h1 of the heat medium of the high temperature heat medium tank 17 increases and the liquid level h2 of the heat medium of the low temperature heat medium tank 18 decreases until the pump 21A is stopped by the end of the charging operation.

If the pressure P1 is not equal to or higher than the pressure P2 in step S2, that is, if the pressure P1 is less than the pressure P2, the process proceeds to step S4.

Figure 5:
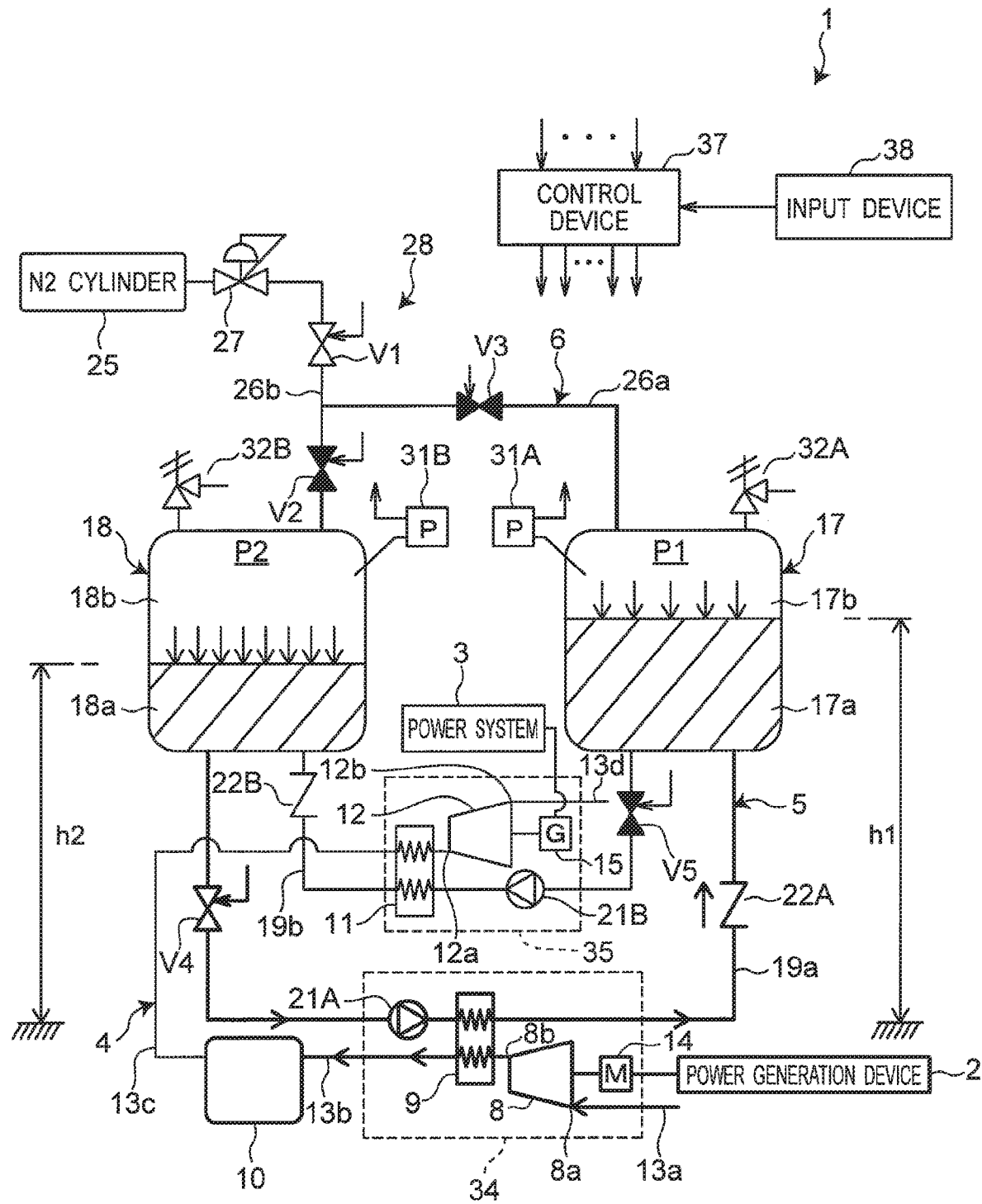
FIG. 5 is a schematic configuration diagram illustrating a setting of opening and closing of the valve at the time of the charging operation (N2 consumption reduction priority, P1<P2)

Step S4 is a case where during the charging operation in the N2 consumption reduction priority mode, the pressure P1 of the gas phase portion 17b of the high temperature heat medium tank 17 is less than the pressure P2 of the gas phase portion 18b of the low temperature heat medium tank 18. Referring also to FIG. 5, in step S4, the valve V1 is set to be closed (or may be set to be closed), and the valves V2 and V3 are set to be closed. By setting V1 to V3 to be opened and closed, the high temperature heat medium tank 17 and the low temperature heat medium tank 18 are blocked from each other, and the N2 cylinder 25 is blocked from both the high temperature heat medium tank 17 and the low temperature heat medium tank 18 (second state).

Assuming that the valves V1 to V3 are set to be opened and closed as illustrated in FIG. 5, the high temperature heat medium tank 17 and the low temperature heat medium tank 18 are blocked from each other, and thus a pressure difference between the pressure P1 of the high temperature heat medium tank 17 and the pressure P2 of the low temperature heat medium tank 18 is maintained. Since the pressure increase necessary for the pump 21A is assisted by the pressure difference (P2−P1), the power consumption of the pump 21A is reduced until the pressure P2 of the low temperature heat medium tank 18 becomes lower than the pressure P1 of the high temperature heat medium tank 17 (P2<P1). In particular, when the following Expression (2) is established, the power consumption of the pump 21A becomes zero.

[Expression 2]

$$P2 = P1 + \rho g(h1-h2) + \Delta PLc \quad (2)$$

P2: Pressure of gas phase of low temperature heat medium tank
P1: Pressure of gas phase of high temperature heat medium tank
ρ: Density of heat medium
g: Gravitational acceleration
h1: Liquid level of heat medium of high temperature heat medium tank 17
h2: Liquid level of heat medium of low temperature heat medium tank 18
ΔPLc: Piping pressure loss The liquid level h1 of the heat medium of the high temperature heat medium tank 17 increases and the liquid level h2 of the heat medium of the low temperature heat medium tank 18 decreases until the pump 21A is stopped by the end of the charging operation.

As described above, if the power consumption reduction priority mode is set in step S1, the process proceeds to step S5.

In step S5, it is determined whether or not the pressure P1 of the gas phase portion 17b of the high temperature heat medium tank 17 detected by the pressure sensor 31A is equal to or higher than the pressure P2 of the gas phase portion 18b of the low temperature heat medium tank 18 detected by the pressure sensor 31B.

If the pressure P1 is equal to or higher than the pressure P2 in step S5, the process proceeds to step S6.

Figure 6:
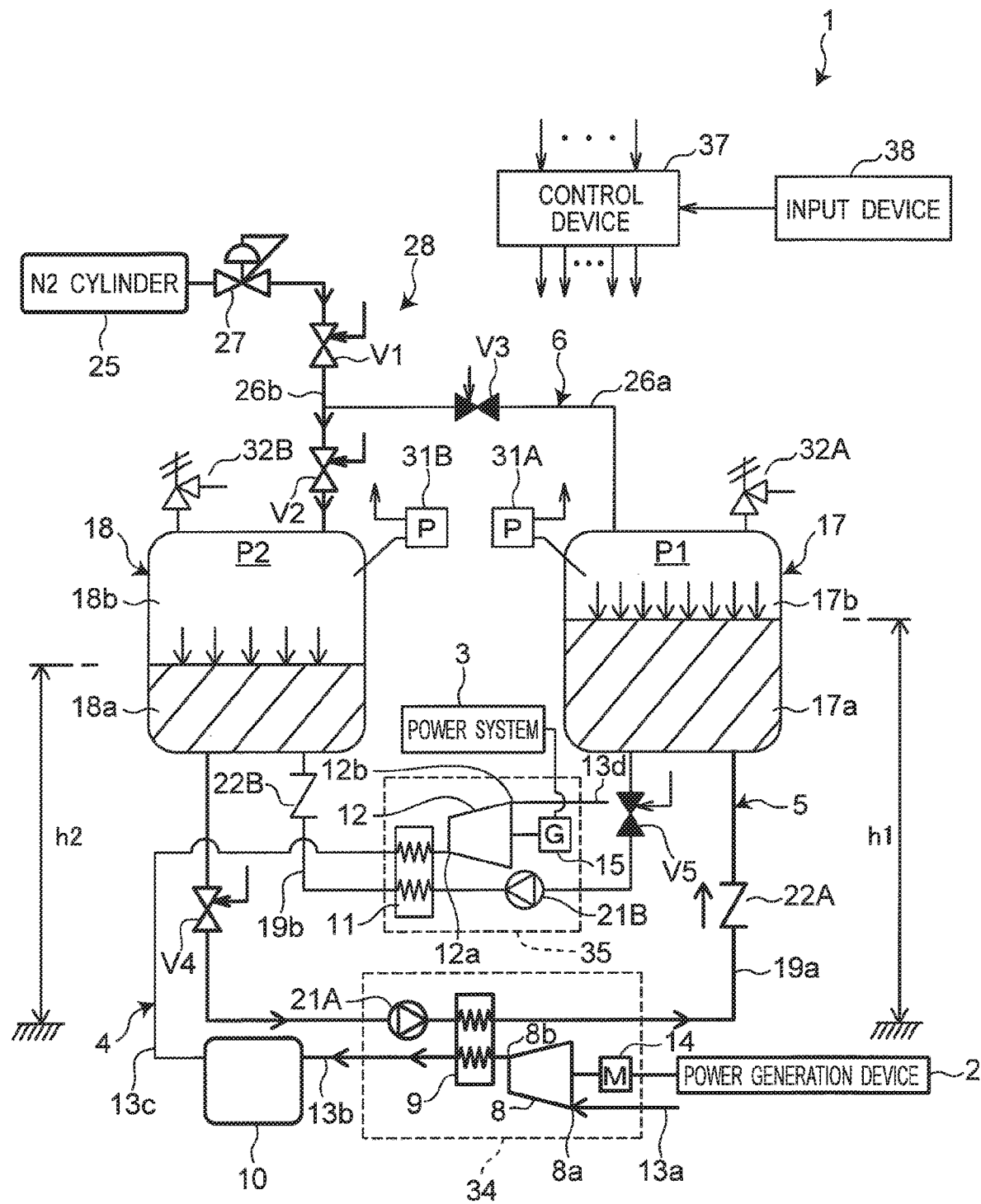
FIG. 6 is a schematic configuration diagram illustrating a setting of opening and closing of the valve at the time of the charging operation (power consumption reduction priority, P1≥P2)

Step S6 is a case where during the charging operation in the power consumption reduction priority mode, the pressure P1 of the gas phase portion 17b of the high temperature heat medium tank 17 is equal to or higher than the pressure P2 of the gas phase portion 18b of the low temperature heat medium tank 18. Referring also to FIG. 6, in step S3, the valves V1 and V2 are set to be opened, and the valve V3 is set to be closed. By setting the valves V1 to V3 to be opened and closed, the N2 cylinder 25 is in communication with the low temperature heat medium tank 18 through the inert gas flow paths 26a and 26b. Further, the high temperature heat medium tank 17 is blocked from the low temperature heat medium tank 18 and the N2 cylinder 25 (third state).

By setting the valves V1 to V3 to be opened and closed as illustrated in FIG. 6, the N2 gas is supplied from the N2 cylinder 25 to the low temperature heat medium tank 18 through the inert gas flow paths 26a and 26b. As a result, the gas phase portion 17b of the high temperature heat medium tank 17 and the gas phase portion 18b of the low temperature heat medium tank 18 are equalized.

The supply of N2 gas from the N2 cylinder 25 to the low temperature heat medium tank 18 may be continued until the pressure P2 of the low temperature heat medium tank 18 becomes equal to the pressure P1 of the high temperature heat medium tank 17 (P2=P1). Also, the supply of N2 gas from the N2 cylinder 25 to the low temperature heat medium tank 18 may be continued even after the pressure P2 of the low temperature heat medium tank 18 becomes larger than the pressure P1 of the high temperature heat medium tank 17 (P2>P1).

By supplying N2 gas from the N2 cylinder 25 to the low temperature heat medium tank 18 until the pressures P1 and P2 become equal, the total head ΔP of the pump 21A is lowered by the pressure increase (P1−P2) required for the low temperature heat medium tank 18 to be lower than the high temperature heat medium tank. That is, the power consumption of the pump 21A is reduced by the pressure increase (P1−P2). The total head ΔP of the pump 21A is represented by the following Expression (3).

[Expression 3]

$$\Delta P = \rho g(h1-h2) + \Delta PLc \quad (3)$$

ΔP: Total head of pump
ρ: Density of heat medium
g: Gravitational acceleration
h1: Liquid level of heat medium of high temperature heat medium tank 17
h2: Liquid level of heat medium of low temperature heat medium tank 18
ΔPLc: Piping pressure loss By continuing the supply of N2 gas from the N2 cylinder 25 to the low temperature heat medium tank 18 even after the pressure P2 of the low temperature heat medium tank 18 becomes larger than the pressure P1 of the high temperature heat medium tank 17, the consumption power of the pump 21A is further reduced. Assuming that the pressure of the gas phase portion 18b of the low temperature heat medium tank 18 satisfies P2=P2'(P2'>P1), the pressure feeding of the heat medium to the high temperature heat medium tank 17 from the low temperature heat medium tank 18 is assisted by the pump 21A by a differential pressure (P2'−P1). In particular, when the following Expression (4) is established, the power consumption of the pump 21A becomes zero.

[Expression 4]

$$P2'=P1+\rho g(h1-h2)+\Delta PLc \quad (4)$$

P2': Pressure of gas phase of low temperature heat medium tank
P1: Pressure of gas phase of high temperature heat medium tank
ρ: Density of heat medium
g: Gravitational acceleration
h1: Liquid level of heat medium of high temperature heat medium tank 17
h2: Liquid level of heat medium of low temperature heat medium tank 18
ΔPLc: Piping pressure loss The liquid level h1 of the heat medium of the high temperature heat medium tank 17 increases and the liquid level h2 of the heat medium of the low temperature heat medium tank 18 decreases until the pump 21A is stopped by the end of the charging operation.

If the pressure P1 is not equal to or higher than the pressure P2 in step S5, that is, if the pressure P1 is less than the pressure P2, the process proceeds to step S7.

Figure 7:
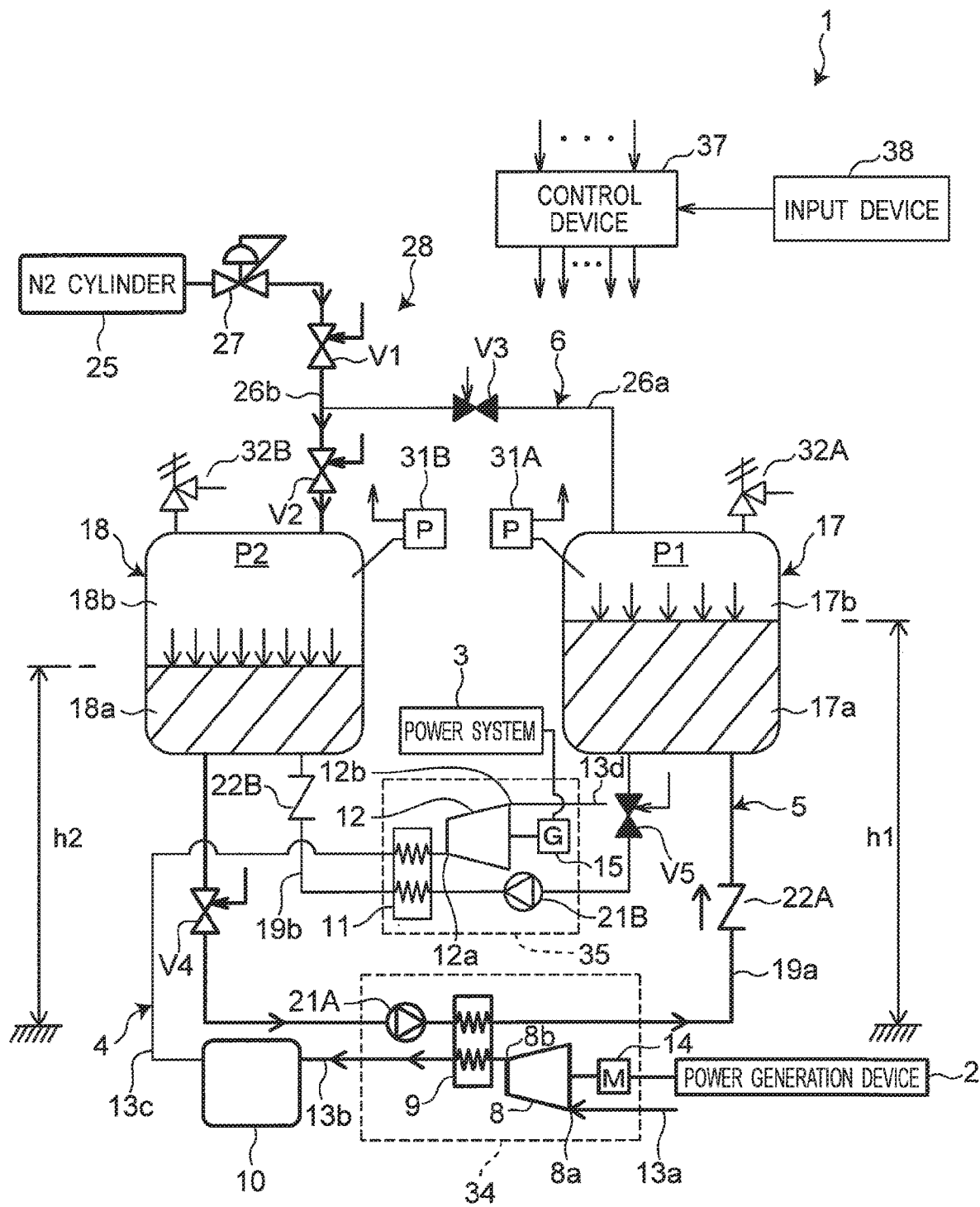
FIG. 7 is a schematic configuration diagram illustrating a setting of opening and closing of the valve at the time of the charging operation (power consumption reduction priority, P1<P2)

Step S7 is a case where during the charging operation in the power consumption reduction priority mode, the pressure P1 of the gas phase portion 17b of the high temperature heat medium tank 17 is less than the pressure P2 of the gas phase portion 18b of the low temperature heat medium tank 18. Referring also to FIG. 7, in step S3, the valves V1 and V2 are set to be opened, and the valve V3 is set to be closed. By setting the valves V1 to V3 to be opened and closed, the N2 cylinder 25 is in communication with the low temperature heat medium tank 18 through the inert gas flow paths 26a and 26b. Further, the high temperature heat medium tank 17 is blocked from the low temperature heat medium tank 18 and the N2 cylinder 25 (third state). That is, setting the opening and closing of the valves V1 to V3 in this case is the same as that in the case of step S6 (FIG. 6).

Assuming that the pressure of the gas phase portion 18b of the low temperature heat medium tank 18 satisfies P2=P2' (P2'>P1), the pressure feeding of the heat medium to the high temperature heat medium tank 17 from the low temperature heat medium tank 18 is assisted by the pump 21A by a differential pressure (P2'−P1). In particular, when the above Expression (4) is established, the power consumption of the pump 21A becomes zero.

The liquid level h1 of the heat medium of the high temperature heat medium tank 17 increases and the liquid level h2 of the heat medium of the low temperature heat medium tank 18 decreases until the pump 21A is stopped by the end of the charging operation.

(Control During Power Generation Operation)

Figure 8:
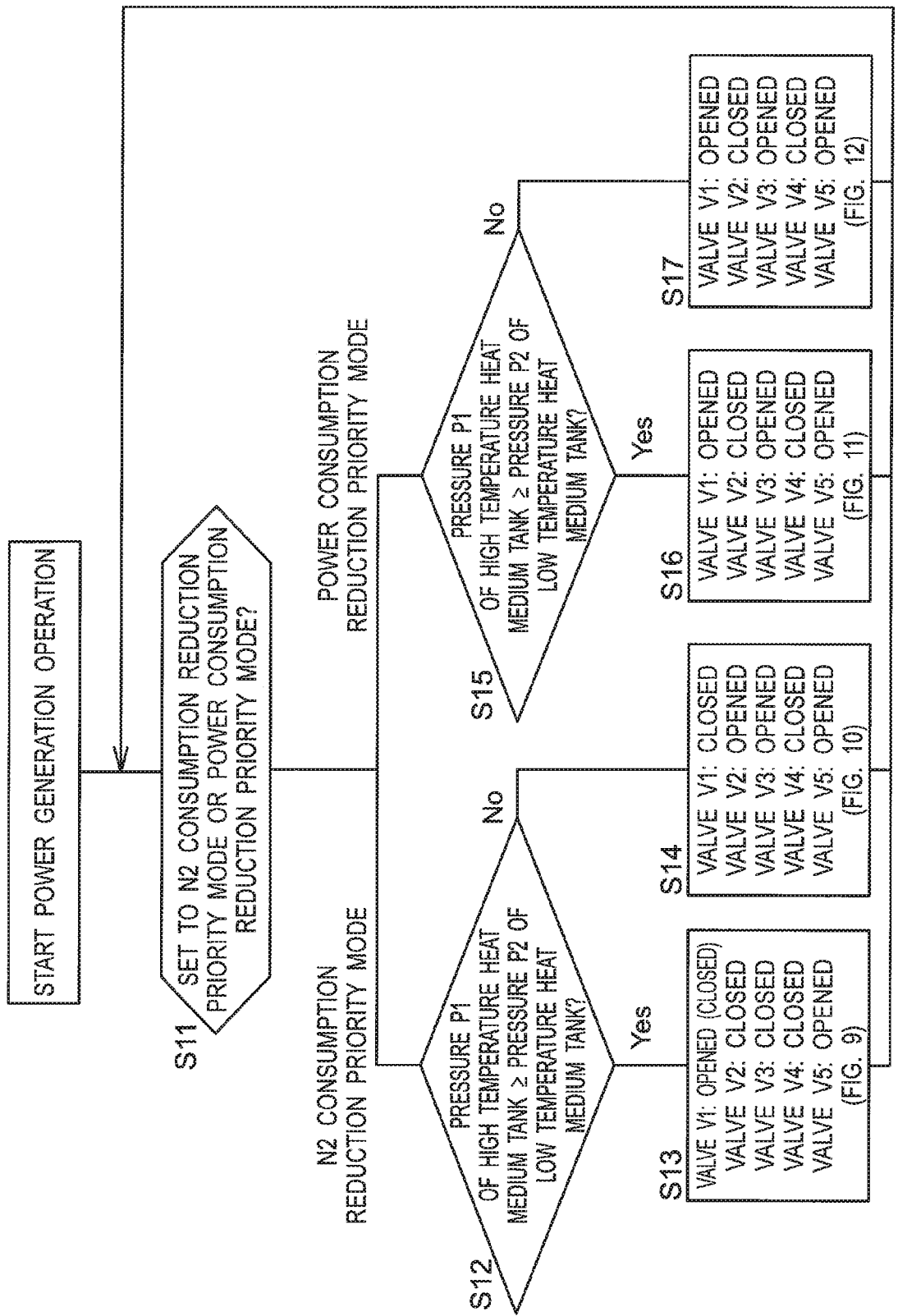
FIG. 8 is a flowchart for describing the switching of a valve at the time of a power generation operation in the second embodiment.

Referring to FIG. 8, in step S11, it is determined whether it is set to the N2 consumption reduction priority mode or the power consumption reduction priority mode. If the N2 consumption reduction priority mode is set, the process proceeds to step S12, and if the power consumption reduction priority mode is set, the process proceeds to step S15.

In step S12, it is determined whether or not the pressure P1 of the gas phase portion 17b of the high temperature heat medium tank 17 detected by the pressure sensor 31A is equal to or higher than the pressure P2 of the gas phase portion 18b of the low temperature heat medium tank 18 detected by the pressure sensor 31B.

If the pressure P1 is equal to or higher than the pressure P2 in step S12, the process proceeds to step S13.

Figure 9:
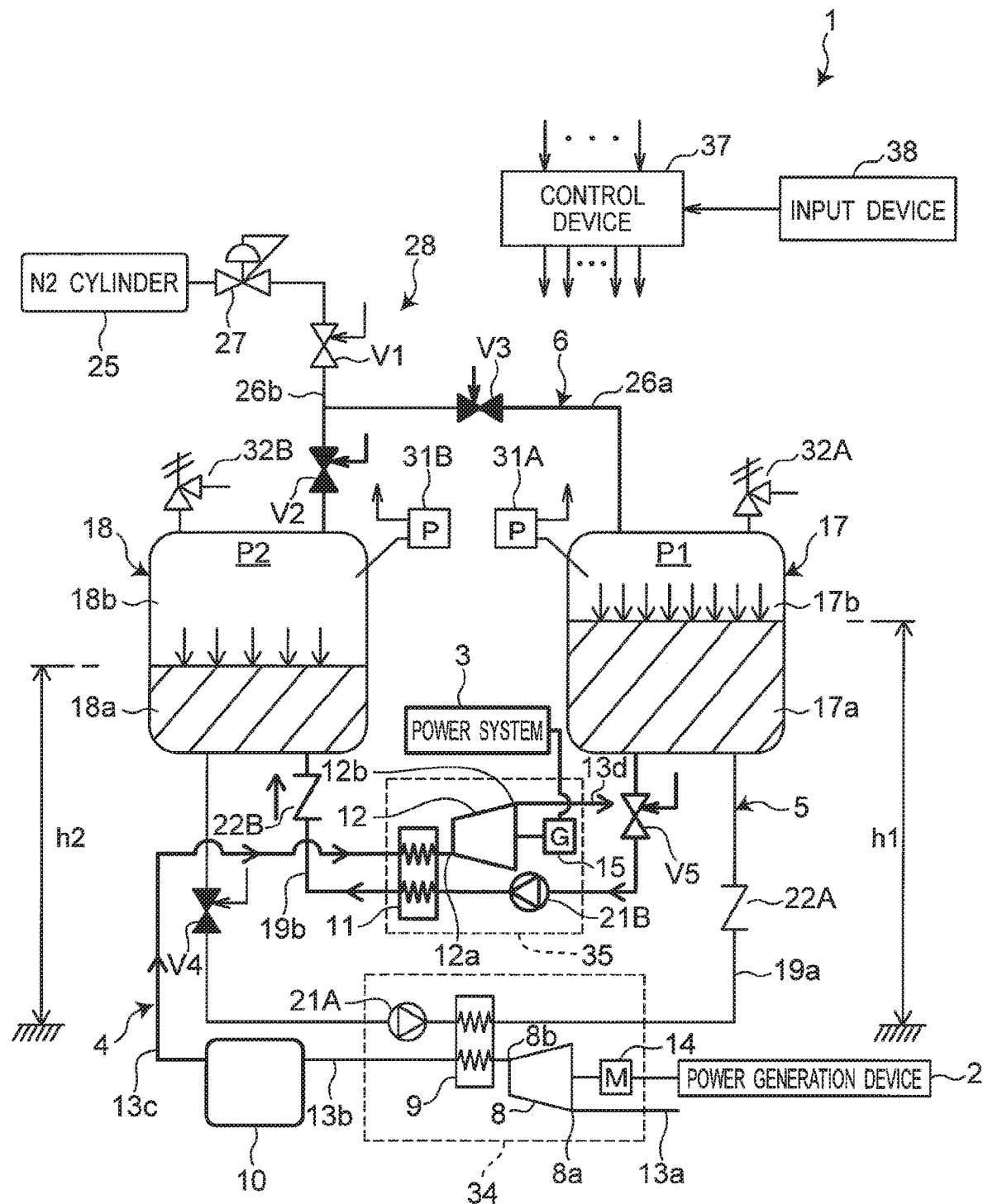
FIG. 9 is a schematic configuration diagram illustrating a setting of opening and closing of the valve at the time of the power generation operation (N2 consumption reduction priority, P1≥P2)

Step S13 is a case where during the power generation operation in the N2 consumption reduction priority mode, the pressure P1 of the gas phase portion 17b of the high temperature heat medium tank 17 is equal to or higher than the pressure P2 of the gas phase portion 18b of the low temperature heat medium tank 18. Referring also to FIG. 9, in step S13, the valve V1 is set to be opened (or may be set to be closed), and the valves V2 and V3 are set to be closed. By setting V1 to V3 to be opened and closed, the high temperature heat medium tank 17 and the low temperature heat medium tank 18 are blocked from each other, and the N2 cylinder 25 is blocked from both the high temperature heat medium tank 17 and the low temperature heat medium tank 18 (second state).

Assuming that the valves V1 to V5 are set to be opened and closed as illustrated in FIG. 9, the high temperature heat medium tank 17 and the low temperature heat medium tank 18 are blocked from each other, and thus a pressure difference between the pressure P1 of the high temperature heat medium tank 17 and the pressure P2 of the low temperature heat medium tank 18 is maintained. Since the necessary pressure increase is assisted by the pump 21B by the pressure difference (P1−P2), the power consumption of the pump 21B is reduced until the pressure P1 of the high temperature heat medium tank 18 becomes lower than the pressure P2 of the low temperature heat medium tank 17 (P1<P2). In particular, when the following Expression (5) is established, the power consumption of the pump 21B becomes zero.

[Expression 5]

$$P1=P2+\rho g(h1-h2)+\Delta PLc \quad (5)$$

P1: Pressure of gas phase of high temperature heat medium tank
P2: Pressure of gas phase of low temperature heat medium tank
ρ: Density of heat medium
g: Gravitational acceleration
h1: Liquid level of heat medium of high temperature heat medium tank 17
h2: Liquid level of heat medium of low temperature heat medium tank 18
ΔPLc: Piping pressure loss The liquid level h1 of the heat medium of the high temperature heat medium tank 17 decreases and the liquid level h2 of the heat medium of the low temperature heat medium tank 18 increases until the pump 21B is stopped by the end of the power generation operation.

If the pressure P1 is not equal to or higher than the pressure P2 in step S12, that is, if the pressure P1 is less than the pressure P2, the process proceeds to step S14.

Figure 10:
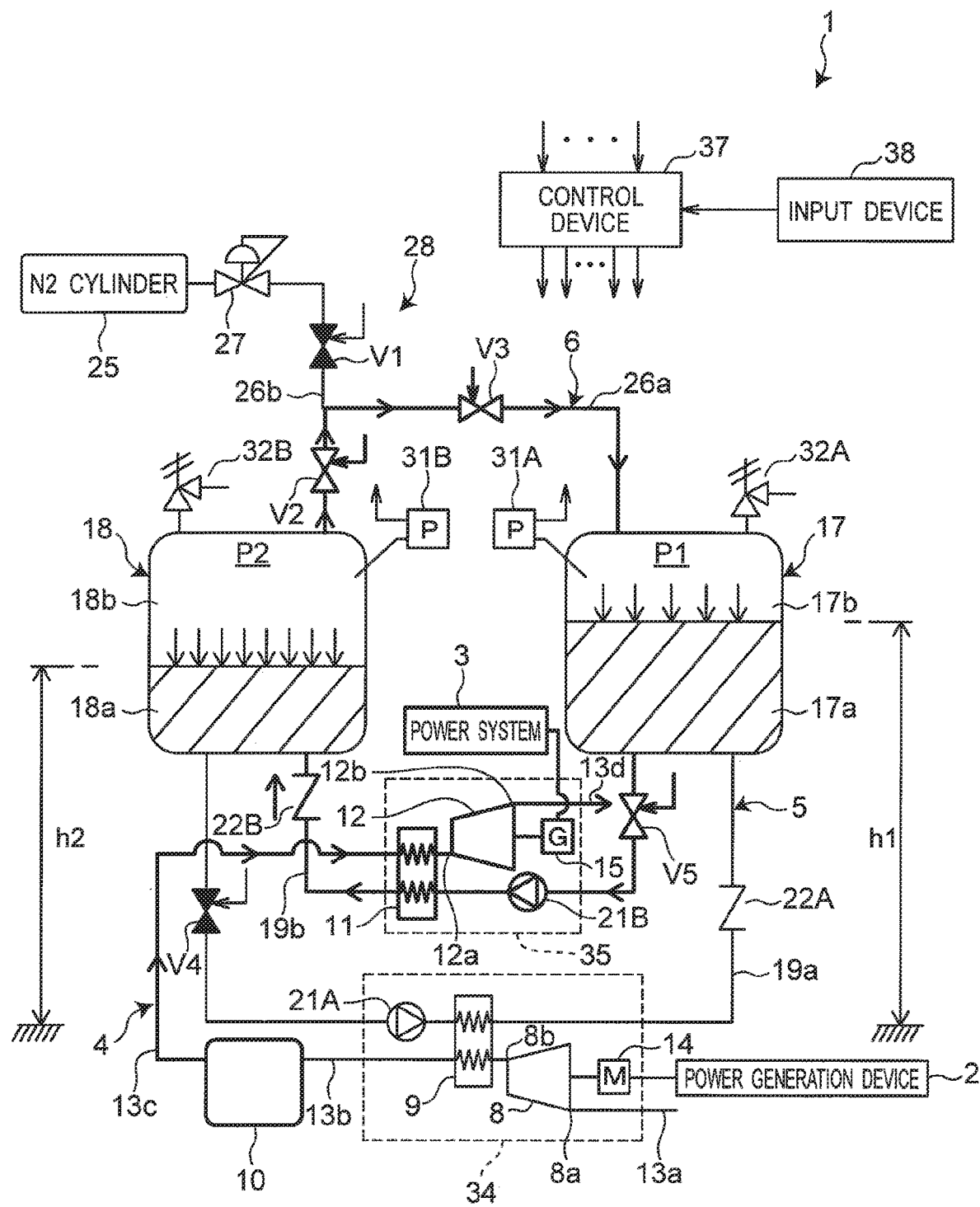
FIG. 10 is a schematic configuration diagram illustrating a setting of opening and closing of the valve at the time of the power generation operation (N2 consumption reduction priority, P1<P2)

Step S14 is a case where during the power generation operation in the N2 consumption reduction priority mode, the pressure P1 of the gas phase portion 17b of the high temperature heat medium tank 17 is less than the pressure P2 of the gas phase portion 18*b* of the low temperature heat medium tank 18. Referring also to FIG. 10, in step S14, the valve V1 is set to be closed, and the valves V2 and V3 are set to be opened. By setting the valves V1 to V3 to be opened and closed, the high temperature heat medium tank 17 and the low temperature heat medium tank 18 communicate with each other through the inert gas flow path 26*a*. Further, the N2 cylinder 25 is blocked from both the high temperature heat medium tank 17 and the low temperature heat medium tank 18 (first state).

By setting the valves V1 to V3 to be opened or closed as illustrated in FIG. 10, the N2 gas in the gas phase portion 18*b* of the low temperature heat medium tank 18 moves to the gas phase portion 17*b* of the high temperature heat medium tank 17 through the inert gas flow path 26*a* until the pressure P1 of the high temperature heat medium tank 17 becomes equal to the pressure P2 of the low temperature heat medium tank 18 (P1=P2). That is, due to the movement of the N2 gas through the inert gas flow path 26*a*, the gas phase portion 17*b* of the high temperature heat medium tank 17 and the gas phase portion 18*b* of the low temperature heat medium tank 18 are equalized. Due to the movement of the N2 gas, the pressure P2 of the low temperature heat medium tank 18 decreases, and the pressure P2 of the high temperature heat medium tank 17 increases. Therefore, the total head ΔP of the pump 21B decreases by the pressure increase (P2−P1) necessary in a case where the gas phase portion 17*b* of the high temperature heat medium tank 17 and the gas phase portion 18*b* of the low temperature heat medium tank 18 do not communicate with each other. That is, the power consumption of the pump 21B is reduced by the pressure increase (P2−P1). The total head ΔP of the pump 21B is represented by the following Expression (6).

[Expression 6]

$$\Delta P = \rho g (h2-h1) + \Delta PLc \qquad (6)$$

ΔP: Total head of pump
ρ: Density of heat medium
g: Gravitational acceleration
h1: Liquid level of heat medium of high temperature heat medium tank 17
h2: Liquid level of heat medium of low temperature heat medium tank 18
ΔPLc: Piping pressure loss The liquid level h1 of the heat medium of the high temperature heat medium tank 17 decreases and the liquid level h2 of the heat medium of the low temperature heat medium tank 18 increases until the pump 21B is stopped by the end of the power generation operation.

As described above, if the power consumption reduction priority mode is set in step S11, the process proceeds to step S15.

In step S15, it is determined whether or not the pressure P1 of the gas phase portion 17*b* of the high temperature heat medium tank 17 detected by the pressure sensor 31A is equal to or higher than the pressure P2 of the gas phase portion 18*b* of the low temperature heat medium tank 18 detected by the pressure sensor 31B.

If the pressure P1 is equal to or higher than the pressure P2 in step S15, the process proceeds to step S16.

Figure 11:
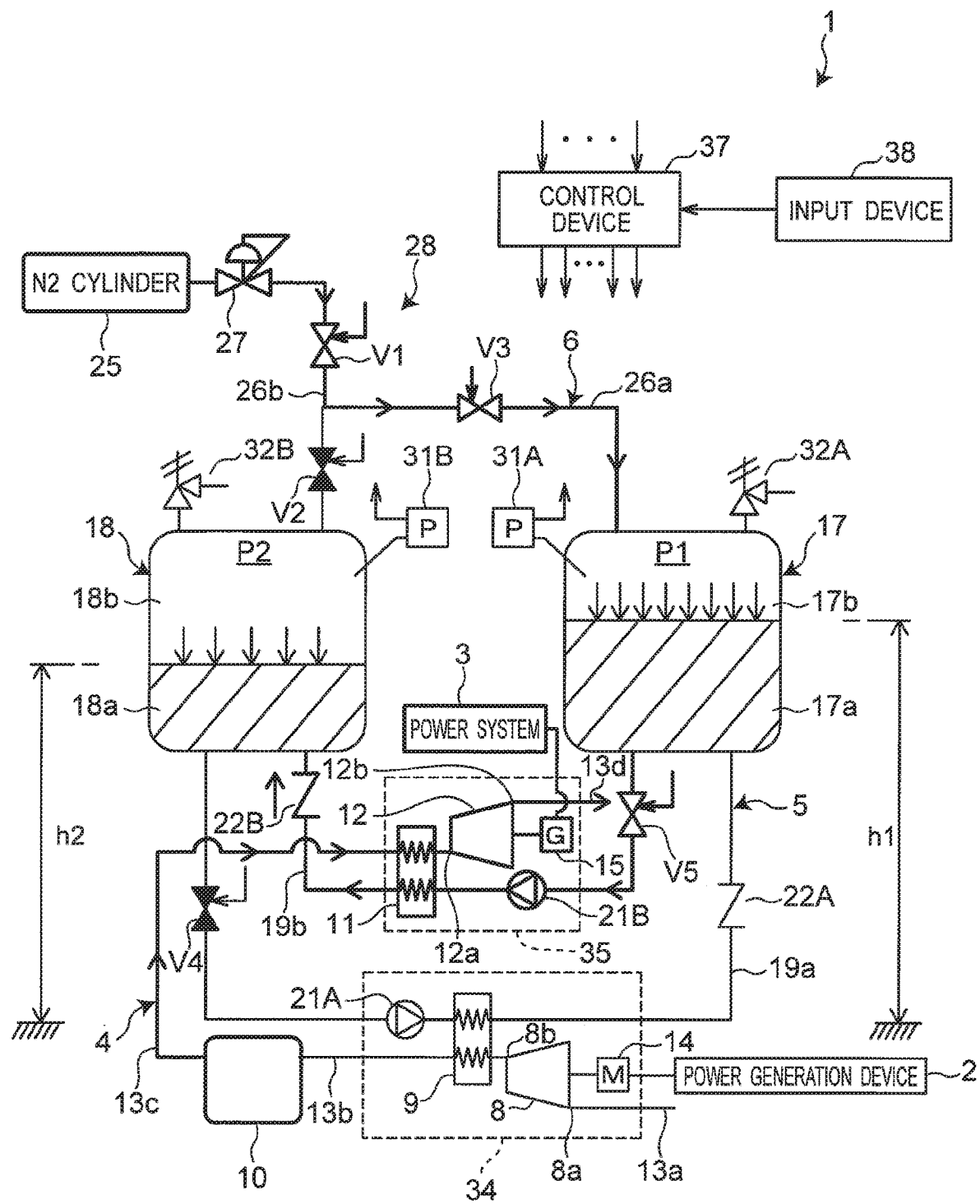
FIG. 11 is a schematic configuration diagram illustrating a setting of opening and closing of the valve at the time of the power generation operation (power consumption reduction priority, P1≥P2)

Step S16 is a case where during the power generation operation in the power consumption reduction priority mode, the pressure P1 of the gas phase portion 17*b* of the high temperature heat medium tank 17 is equal to or higher than the pressure P2 of the gas phase portion 18*b* of the low temperature heat medium tank 18. Referring also to FIG. 11, in step S16, the valves V1 and V3 are set to be opened, and the valve V2 is set to be closed. By setting the valves V1 to V3 to be opened and closed, the N2 cylinder 25 is in communication with the high temperature heat medium tank 17 through the inert gas flow paths 26*a* and 26*b*. Further, the low temperature heat medium tank 18 is blocked from the high temperature heat medium tank 17 and the N2 cylinder 25 (fourth state).

Assuming that the pressure of the gas phase portion 17*b* of the high temperature heat medium tank 17 satisfies P1=P1' (P1'>P2), the pressure feeding of the heat medium to the low temperature heat medium tank 18 from the high temperature heat medium tank 17 is assisted by the pump 21B by a differential pressure (P1'−P2). In particular, when the following Expression (7) is established, the power consumption of the pump 21A becomes zero.

[Expression 7]

$$P1' = P2 + \rho g(h2-h1) + \Delta PLc \qquad (7)$$

P1': Pressure of gas phase of high temperature heat medium tank
P2: Pressure of gas phase of low temperature heat medium tank
ρ: Density of heat medium
g: Gravitational acceleration
h1: Liquid level of heat medium of high temperature heat medium tank 17
h2: Liquid level of heat medium of low temperature heat medium tank 18
ΔPLc: Piping pressure loss The liquid level h1 of the heat medium of the high temperature heat medium tank 17 decreases and the liquid level h2 of the heat medium of the low temperature heat medium tank 18 increases until the pump 21B is stopped by the end of the power generation operation.

If the pressure P1 is not equal to or higher than the pressure P2 in step S15, that is, if the pressure P1 is less than the pressure P2, the process proceeds to step S17.

Figure 12:
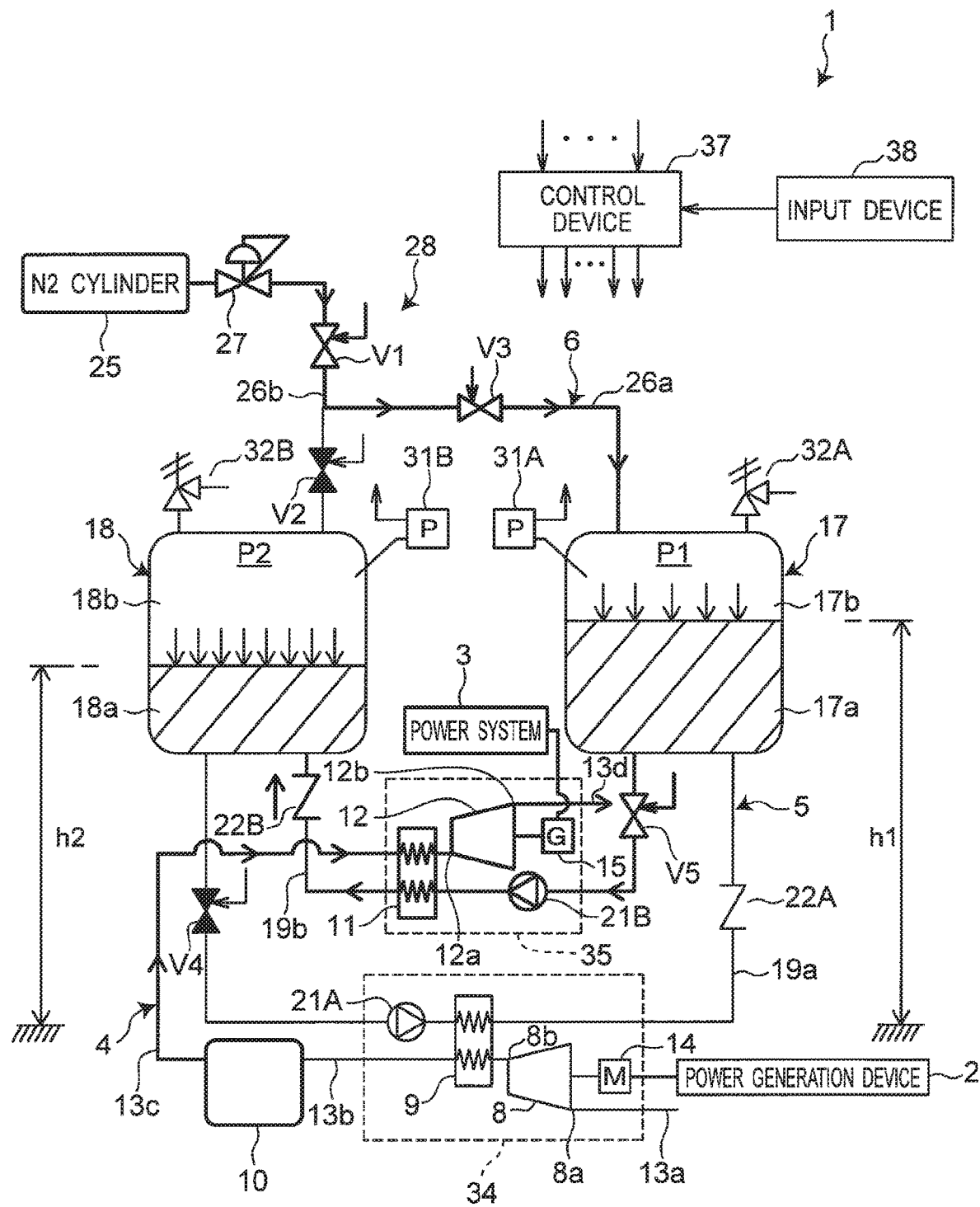
FIG. 12 is a schematic configuration diagram illustrating a setting of opening and closing of the valve at the time of the power generation operation (power consumption reduction priority, P1<P2)

Step S17 is a case where during the power generation operation in the power consumption reduction priority mode, the pressure P1 of the gas phase portion 17*b* of the high temperature heat medium tank 17 is less than the pressure P2 of the gas phase portion 18*b* of the low temperature heat medium tank 18. Referring also to FIG. 12, in step S17, the valves V1 and V2 are set to be opened, and the valve V3 is set to be closed. By setting the valves V1 to V3 to be opened and closed, the N2 cylinder 25 is in communication with the high temperature heat medium tank 17 through the inert gas flow paths 26*a* and 26*b*. Further, the low temperature heat medium tank 18 is blocked from the high temperature heat medium tank 17 and the N2 cylinder 25 (fourth state). That is, setting the opening and closing of the valves V1 to V3 in this case is the same as that in the case of step S16 (FIG. 11).

By setting the valves V1 to V3 to be opened and closed as illustrated in FIG. 12, the N2 gas is supplied from the N2 cylinder 25 to the high temperature heat medium tank 17 through the inert gas flow paths 26*a* and 26*b*. As a result, the gas phase portion 17*b* of the high temperature heat medium tank 17 and the gas phase portion 18*b* of the low temperature heat medium tank 18 are equalized.

The supply of N2 gas from the N2 cylinder 25 to the high temperature heat medium tank 17 may be continued until the pressure P1 of the high temperature heat medium tank 17 becomes equal to the pressure P2 of the low temperature heat medium tank 18 (P1=P2). Also, the supply of N2 gas from the N2 cylinder 25 to the high temperature heat medium tank 17 may be continued even after the pressure P1 of the high temperature heat medium tank 17 becomes larger than the pressure P2 of the high temperature heat medium tank 18 (P1>P2).

By supplying N2 gas from the N2 cylinder 25 to the high temperature heat medium tank 17 until the pressures P1 and P2 become equal, the total head ΔP of the pump 21A is lowered by the pressure increase (P2−P1) required for the high temperature heat medium tank 17 to be lower than the low temperature heat medium tank 18. That is, the power consumption of the pump 21B is reduced by the pressure increase (P2−P1). The total head ΔP of the pump 21B is represented by the following Expression (8).

[Expression 8]

$$\Delta P = \rho g(h2-h1) + \Delta PLc \quad (8)$$

ΔP: Total head of pump
ρ: Density of heat medium
g: Gravitational acceleration
h1: Liquid level of heat medium of high temperature heat medium tank 17
h2: Liquid level of heat medium of low temperature heat medium tank 18
ΔPLc: Piping pressure loss By continuing the supply of N2 gas from the N2 cylinder 25 to the high temperature heat medium tank 17 even after the pressure P1 of the high temperature heat medium tank 17 becomes larger than the pressure P2 of the low temperature heat medium tank 18, the consumption power of the pump 21B is further reduced. Assuming that the pressure of the gas phase portion 17b of the high temperature heat medium tank 17 satisfies P1=P1' (P1'>P2), the pressure feeding of the heat medium to the high temperature heat medium tank 17 from the low temperature heat medium tank 18 is assisted by the pump 21B by a differential pressure (P1'−P2). In particular, when the above Expression (7) is established, the power consumption of the pump 21B becomes zero.

The liquid level h1 of the heat medium of the high temperature heat medium tank 17 decreases and the liquid level h2 of the heat medium of the low temperature heat medium tank 18 increases until the pump 21B is stopped by the end of the power generation operation.

In the third and fourth embodiments of the present invention described below, the device configuration of the CAES power generation device 1 is the same as that of the second embodiment (FIG. 2). Therefore, with regard to these embodiments, the control of the flow path switching unit 28 executed by the control device 37 will be described, and FIG. 2 is referred to for the device configuration.

Third Embodiment

The control device 37 controls open and close states of the three valves V1 to V3 constituting the flow path switching unit 28 based on the following, and thereby the inert gas flow paths 26a and 26b constituting the inert gas flow path system 6 is switched to the communication state.

Whether the CAES power generation device 1 is performing the charging operation or the power generation operation.

Whether to give priority to N2 consumption reduction or power consumption reduction.

Whether or not the pressure P1 of the gas phase portion 17b of the high temperature heat medium tank 17 detected by the pressure sensor 31A is equal to or higher than the pressure P2 of the gas phase portion 18b of the low temperature heat medium tank 18 detected by the pressure sensor 31B In the present embodiment, unlike the second embodiment, whether it is set to the N2 consumption reduction priority mode or the power consumption reduction priority mode is not input to the control device 37. In the present embodiment, the control device 37 determines which of N2 consumption reduction and power consumption reduction is to be prioritized based on, for example, the pressure P1 of the gas phase portion 17b of the high temperature heat medium tank 17, the pressure P2 of the gas phase portion 18b of the low temperature heat medium tank 18, and the power consumption of the CAES device 1.

(Control During Charging Operation)

Figure 13:
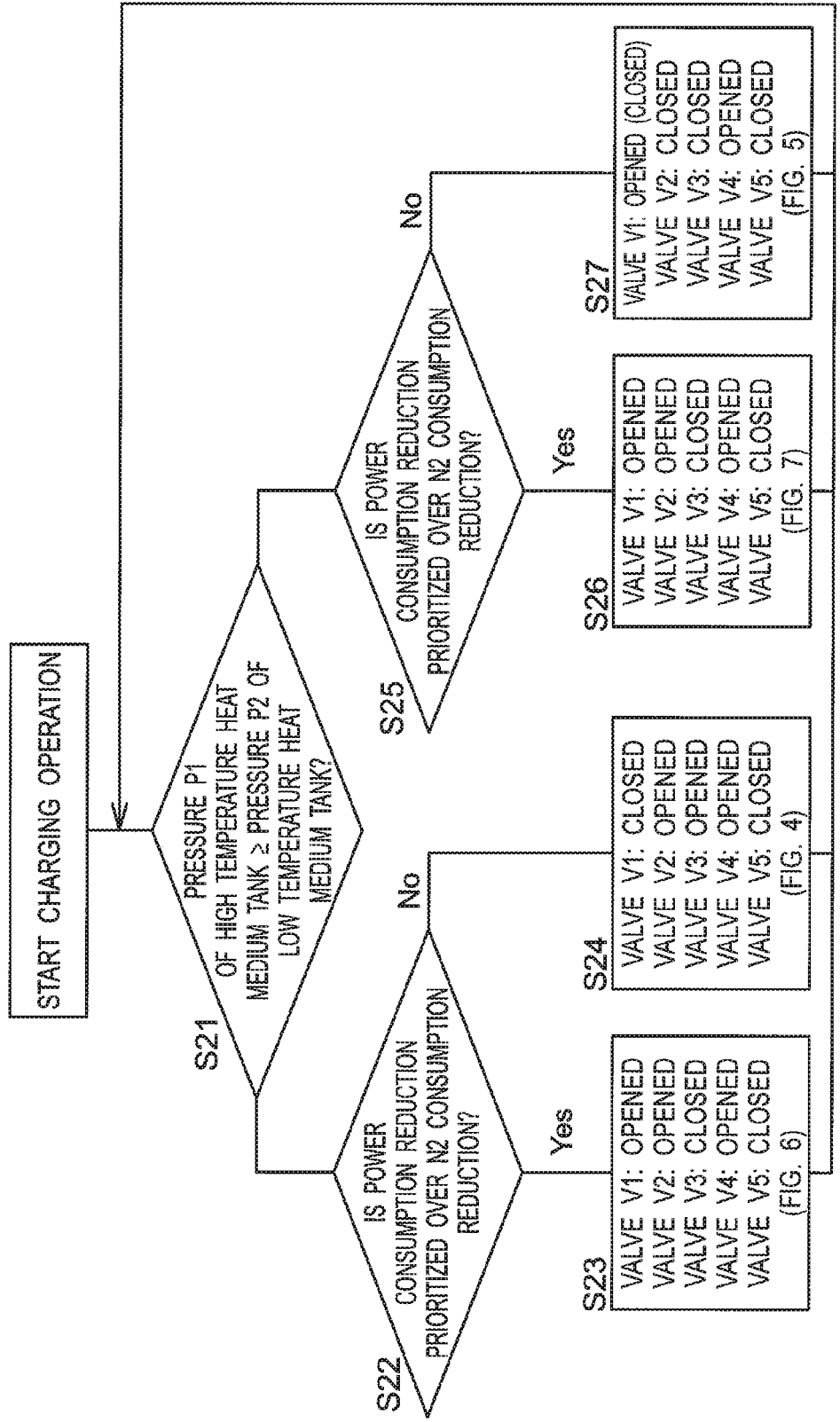
FIG. 13 is a flowchart for describing the switching of a valve at the time of a charging operation in a third embodiment.

Referring to FIG. 13, in step S21, it is determined whether or not the pressure P1 of the gas phase portion 17b of the high temperature heat medium tank 17 detected by the pressure sensor 31A is equal to or higher than the pressure P2 of the gas phase portion 18b of the low temperature heat medium tank 18 detected by the pressure sensor 31B. If the pressure P1 is equal to or higher than the pressure P2, the process proceeds to step S22, and if the pressure P1 is less than the pressure P2, the process proceeds to step S25.

In step S22, it is determined whether the power consumption reduction is prioritized over the N2 consumption reduction. In a case where the priority is given to the power consumption reduction, the process proceeds to step S23, and in a case where the priority is given to the N2 consumption reduction, the process proceeds to step S24.

Step S23 is a case where during the charging operation in which the priority is given to the power consumption reduction, the pressure P1 of the gas phase portion 17b of the high temperature heat medium tank 17 is equal to or higher than the pressure P2 of the gas phase portion 18b of the low temperature heat medium tank 18. Referring also to FIG. 6, in step S23, the valves V1 and V2 are set to be opened, and the valve V3 is set to be closed. By setting the valves V1 to V3 to be opened and closed, the N2 cylinder 25 is in communication with the low temperature heat medium tank 18 through the inert gas flow paths 26a and 26b. Further, the high temperature heat medium tank 17 is blocked from the low temperature heat medium tank 18 and the N2 cylinder 25 (third state).

As described in regard to step S6 of the second embodiment, by setting the valves V1 to V3 to be opened and closed as illustrated in FIG. 6, the power consumption of the pump 21A can be reduced by the supply of the N2 gas from the N2 cylinder 25 to the low temperature heat medium tank 18.

Step S24 is a case where during the charging operation in which the priority is given to the N2 consumption reduction, the pressure P1 of the gas phase portion 17b of the high temperature heat medium tank 17 is equal to or higher than the pressure P2 of the gas phase portion 18b of the low temperature heat medium tank 18. Referring also to FIG. 4, in step S24, the valve V1 is set to be closed, and the valves V2 and V3 are set to be opened. By setting the valves V1 to V3 to be opened and closed, the high temperature heat medium tank 17 and the low temperature heat medium tank 18 communicate with each other through the inert gas flow path 26a. Further, the N2 cylinder 25 is blocked from both the high temperature heat medium tank 17 and the low temperature heat medium tank 18 (first state).

As described in regard to step S3 of the second embodiment, when setting the valves V1 to V3 to be opened and closed as illustrated in FIG. 4, due to the movement of the N2 gas through the inert gas flow path 26a, the gas phase portion 17b of the high temperature heat medium tank 17 and the gas phase portion 18b of the low temperature heat medium tank 18 are equalized. Further, the power consumption of the pump 21A is reduced by the pressure increase (P1−P2) necessary in a case where the gas phase portion 17b of the high temperature heat medium tank 17 and the gas phase portion 18b of the low temperature heat medium tank 18 do not communicate with each other.

In step S25, it is determined whether the power consumption reduction is prioritized over the N2 consumption reduction. In a case where the priority is given to the power consumption reduction, the process proceeds to step S26, and in a case where the priority is given to the N2 consumption reduction, the process proceeds to step S27.

Step S26 is a case where during the charging operation in which the priority is given to the power consumption reduction, the pressure P1 of the gas phase portion 17b of the high temperature heat medium tank 17 is less than the pressure P2 of the gas phase portion 18b of the low temperature heat medium tank 18. Referring also to FIG. 7, in step S26, the valves V1 and V2 are set to be opened, and the valve V3 is set to be closed. By setting the valves V1 to V3 to be opened and closed, the N2 cylinder 25 is in communication with the low temperature heat medium tank 18 through the inert gas flow paths 26a and 26b. Further, the high temperature heat medium tank 17 is blocked from the low temperature heat medium tank 18 and the N2 cylinder 25 (third state).

As described in regard to step S7 of the second embodiment, by setting the valves V1 to V3 to be opened and closed as illustrated in FIG. 7, the power consumption of the pump 21A can be reduced by the supply of the N2 gas from the N2 cylinder 25 to the low temperature heat medium tank 18.

Step S27 is a case where during the charging operation in which the priority is given to the N2 consumption reduction, the pressure P1 of the gas phase portion 17b of the high temperature heat medium tank 17 is less than the pressure P2 of the gas phase portion 18b of the low temperature heat medium tank 18. Referring also to FIG. 5, in step S27, the valve V1 is set to be closed (or may be set to be closed), and the valves V2 and V3 are set to be closed. By setting V1 to V3 to be opened and closed, the high temperature heat medium tank 17 and the low temperature heat medium tank 18 are blocked from each other, and the N2 cylinder 25 is blocked from both the high temperature heat medium tank 17 and the low temperature heat medium tank 18 (second state).

As described in regard to step S4 of the second embodiment, by setting the valves V1 to V3 to be opened and closed as illustrated in FIG. 5, the pressure increase necessary for the pump 21A is assisted by the pressure difference (P2−P1) between the high temperature heat medium tank 17 and the low temperature heat medium tank 18, the and the power consumption of the pump 21A is reduced.

(Control During Power Generation Operation)

Figure 14:
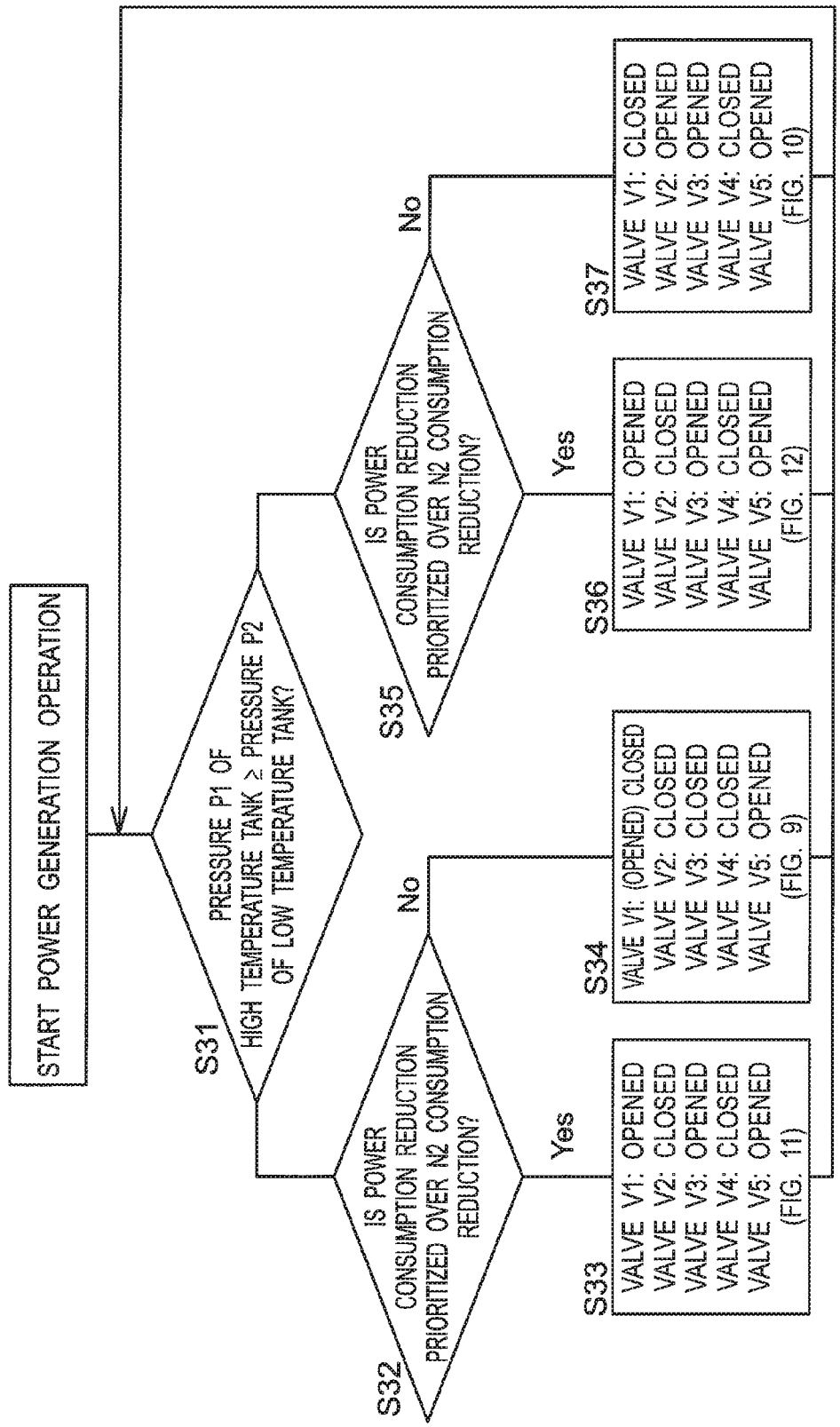
FIG. 14 is a flowchart for describing the switching of a valve at the time of a power generation operation in the third embodiment.

Referring to FIG. 14, in step S31, it is determined whether or not the pressure P1 of the gas phase portion 17b of the high temperature heat medium tank 17 detected by the pressure sensor 31A is equal to or higher than the pressure P2 of the gas phase portion 18b of the low temperature heat medium tank 18 detected by the pressure sensor 31B. If the pressure P1 is equal to or higher than the pressure P2, the process proceeds to step S32, and if the pressure P1 is less than the pressure P2, the process proceeds to step S35.

In step S32, it is determined whether the power consumption reduction is prioritized over the N2 consumption reduction. In a case where the priority is given to the power consumption reduction, the process proceeds to step S33, and in a case where the priority is given to the N2 consumption reduction, the process proceeds to step S34.

Step S33 is a case where during the power generation operation in which the priority is given to the power consumption reduction, the pressure P1 of the gas phase portion 17b of the high temperature heat medium tank 17 is equal to or higher than the pressure P2 of the gas phase portion 18b of the low temperature heat medium tank 18. Referring also to FIG. 11, in step S33, the valves V1 and V3 are set to be opened, and the valve V2 is set to be closed. By setting the valves V1 to V3 to be opened and closed, the N2 cylinder 25 is in communication with the high temperature heat medium tank 17 through the inert gas flow paths 26a and 26b. Further, the low temperature heat medium tank 18 is blocked from the high temperature heat medium tank 17 and the N2 cylinder 25 (fourth state).

As described in regard to step S16 of the second embodiment, by setting the valves V1 to V3 to be opened and closed as illustrated in FIG. 11, the power consumption of the pump 21B can be reduced by the supply of the N2 gas from the N2 cylinder 25 to the high temperature heat medium tank 17.

Step S34 is a case where during the power generation operation in which the priority is given to the N2 consumption reduction, the pressure P1 of the gas phase portion 17b of the high temperature heat medium tank 17 is equal to or higher than the pressure P2 of the gas phase portion 18b of the low temperature heat medium tank 18. Referring also to FIG. 9, in step S34, the valve V1 is set to be closed (or may be set to be closed), and the valves V2 and V3 are set to be closed. By setting V1 to V3 to be opened and closed, the high temperature heat medium tank 17 and the low temperature heat medium tank 18 are blocked from each other, and the N2 cylinder 25 is blocked from both the high temperature heat medium tank 17 and the low temperature heat medium tank 18 (second state).

As described in regard to step S13 of the second embodiment, by setting the valves V1 to V3 to be opened and closed as illustrated in FIG. 9, the pressure increase necessary for the pump 21B is assisted by the pressure difference (P1−P2) between the high temperature heat medium tank 17 and the low temperature heat medium tank 18, the and the power consumption of the pump 21B is reduced.

In step S35, it is determined whether the power consumption reduction is prioritized over the N2 consumption reduction. In a case where the priority is given to the power consumption reduction, the process proceeds to step S36, and in a case where the priority is given to the N2 consumption reduction, the process proceeds to step S37.

Step S36 is a case where during the charging operation in which the priority is given to the power consumption reduction, the pressure P1 of the gas phase portion 17b of the high temperature heat medium tank 17 is less than the pressure P2 of the gas phase portion 18b of the low temperature heat medium tank 18. Referring also to FIG. 12, in step S36, the valves V1 and V3 are set to be opened, and the valve V2 is set to be closed. By setting the valves V1 to V3 to be opened and closed, the N2 cylinder 25 is in communication with the high temperature heat medium tank 17 through the inert gas flow paths 26a and 26b. Further, the low temperature heat medium tank 18 is blocked from the high temperature heat medium tank 17 and the N2 cylinder 25 (fourth state).

As described in regard to step S17 of the second embodiment, by setting the valves V1 to V3 to be opened and closed as illustrated in FIG. 12, the power consumption of the pump 21B can be reduced by the supply of the N2 gas from the N2 cylinder 25 to the high temperature heat medium tank 17.

Step S37 is a case where during the charging operation in which the priority is given to the N2 consumption reduction, the pressure P1 of the gas phase portion 17b of the high temperature heat medium tank 17 is less than the pressure P2 of the gas phase portion 18b of the low temperature heat medium tank 18. Referring also to FIG. 10, in step S37, the valve V1 is set to be closed, and the valves V2 and V3 are set to be opened. By setting the valves V1 to V3 to be opened and closed, the high temperature heat medium tank 17 and the low temperature heat medium tank 18 communicate with each other through the inert gas flow path 26a. Further, the N2 cylinder 25 is blocked from both the high temperature heat medium tank 17 and the low temperature heat medium tank 18 (first state).

As described in regard to step S14 of the second embodiment, when setting the valves V1 to V3 to be opened and closed as illustrated in FIG. 10, due to the movement of the N2 gas through the inert gas flow path 26a, the gas phase portion 17b of the high temperature heat medium tank 17 and the gas phase portion 18b of the low temperature heat medium tank 18 are equalized. Further, the power consumption of the pump 21B is reduced by the pressure increase (P2–P1) necessary in a case where the gas phase portion 17b of the high temperature heat medium tank 17 and the gas phase portion 18b of the low temperature heat medium tank 18 do not communicate with each other.

Fourth Embodiment

The control device 37 controls open and close states of the three valves V1 to V3 constituting the flow path switching unit 28 based on the following, and thereby the inert gas flow paths 26a and 26b constituting the inert gas flow path system 6 is switched to the communication state.

Whether the CAES power generation device 1 is performing the charging operation or the power generation operation Whether or not the pressure P1 of the gas phase portion 17b of the high temperature heat medium tank 17 detected by the pressure sensor 31A is equal to or higher than the pressure P2 of the gas phase portion 18b of the low temperature heat medium tank 18 detected by the pressure sensor 31B In the present embodiment, the control corresponding to the power consumption reduction priority mode of the second embodiment is not performed, and the N2 consumption reduction is always prioritized.

Figure 15:
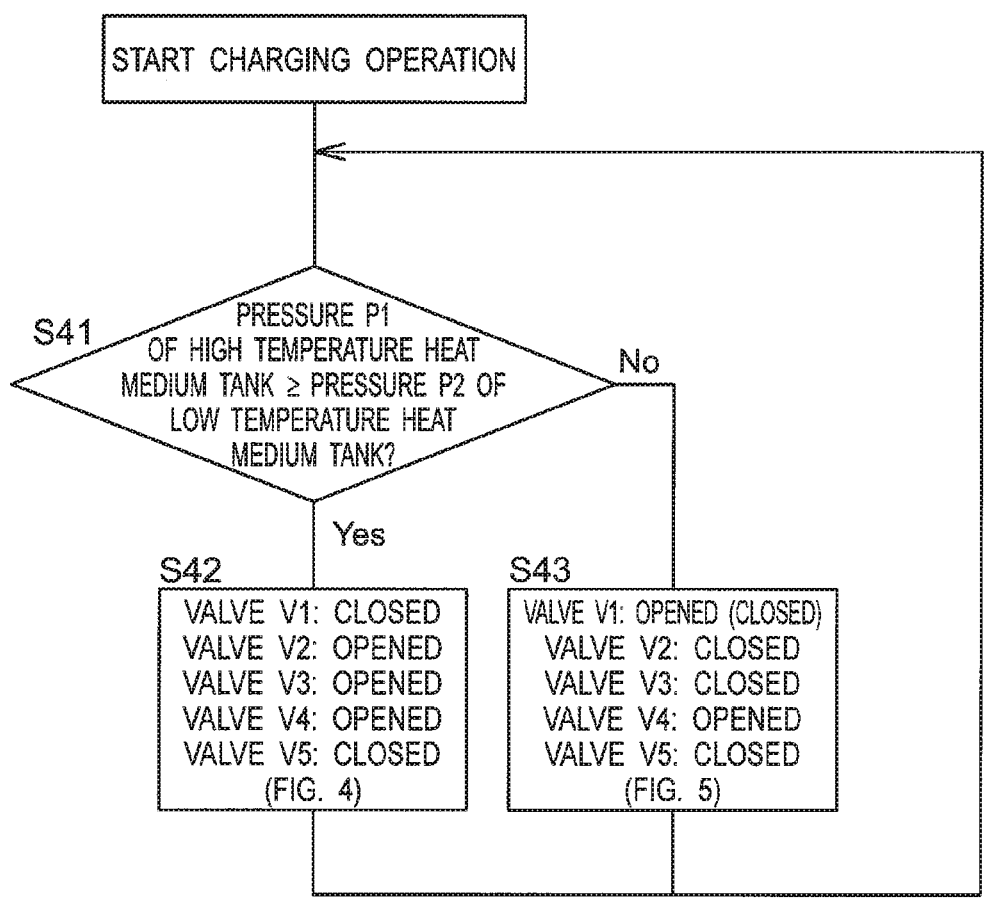
FIG. 15 is a flowchart for describing the switching of a valve at the time of a charging operation in a fourth embodiment.

Referring to FIG. 15, at the time of the charging operation, in step S41, it is determined whether or not the pressure P1 of the high temperature heat medium tank 17 detected by the pressure sensor 31A is equal to or higher than the pressure P2 of the low temperature heat medium tank 18 detected by the pressure sensor 31B. If the pressure P1 is equal to or higher than the pressure P2, the process proceeds to step S42, and if the pressure P1 is less than the pressure P2, the process proceeds to step S43. In step S42, as illustrated in FIG. 4, the open and close states of the valves V1 to V3 are set. In step S43, as illustrated in FIG. 5, the open and close states of the valves V1 to V3 are set.

Figure 16:
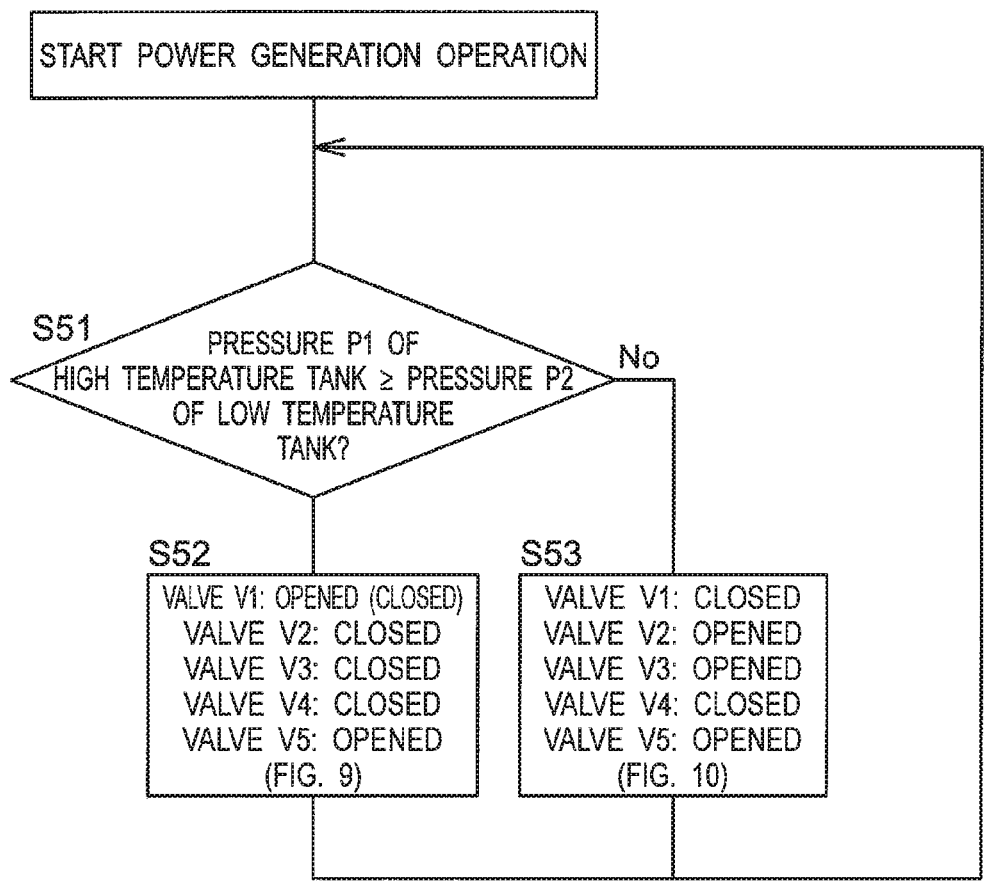
FIG. 16 is a flowchart for describing the switching of a valve at the time of a power generation operation in the fourth embodiment.

Referring to FIG. 16, at the time of power generation operation, in step S51, it is determined whether or not the pressure P1 of the high temperature heat medium tank 17 detected by the pressure sensor 31A is equal to or higher than the pressure P2 of the low temperature heat medium tank 18 detected by the pressure sensor 31B. If the pressure P1 is equal to or higher than the pressure P2, the process proceeds to step S52, and if the pressure P1 is less than the pressure P2, the process proceeds to step S53. In step S52, as illustrated in FIG. 9, the open and close states of the valves V1 to V3 are set. In step S43, as illustrated in FIG. 10, the open and close states of the valves V1 to V3 are set.

The invention claimed is:

1. A compressed air energy storage power generation device, comprising:
    an electric motor driven by fluctuating input power;
    a compressor that is mechanically connected to the electric motor and compresses air;
    an accumulator that is fluidly connected to the compressor and stores compressed air generated by the compressor;
    an expander that is fluidly connected to the accumulator and driven by the compressed air supplied from the accumulator;
    a generator that is mechanically connected to the expander;
    a first heat exchange unit that performs a heat exchange between the compressed air generated by the compressor and a heat medium to raise a temperature of the heat medium;
    a high temperature heat storage unit that is fluidly connected to the first heat exchange unit and stores the heat medium after the heat exchange in the first heat exchange unit;
    a second heat exchange unit that is fluidly connected to the high temperature heat storage unit and performs a heat exchange between the heat medium supplied from the high temperature heat storage unit and the compressed air supplied from the accumulator to the expander to raise a temperature of the compressed air;
    a low temperature heat storage unit that is fluidly connected to the second heat exchange unit and stores a heat medium after the heat exchange in the second heat exchange unit;
    an inert gas source that supplies an inert gas;
    an inert gas flow path system through which a gas phase portion of the high temperature heat storage unit, a gas phase portion of the low temperature heat storage unit, and the inert gas source are fluidly connected to each other; and
    a flow path switching unit that switches the inert gas flow path system to at least a state in which the inert gas source is in communication with both the high temperature heat storage unit and the low temperature heat storage unit and a state in which the inert gas source is blocked from both the high temperature heat storage unit and the low temperature heat storage unit.

2. The compressed air energy storage power generation device according to claim 1, further comprising a control unit that controls the flow path switching unit, wherein
    a state of the inert gas flow path system that is switchable by the flow path switching unit includes:
    a first state in which the high temperature heat storage unit and the low temperature heat storage unit communicate with each other, and the inert gas source is blocked from both the high temperature heat storage unit and the low temperature heat storage unit;
    a second state in which the high temperature heat storage unit and the low temperature heat storage unit are blocked from each other, and the inert gas source is blocked from both the high temperature heat storage unit and the low temperature heat storage unit;
    a third state in which the inert gas source is in communication with the low temperature heat storage unit, and the high temperature heat storage unit is blocked from the low temperature heat storage unit and the inert gas source; and a fourth state in which the inert gas source is in communication with the high temperature heat storage unit, and the low temperature heat storage unit is blocked from the high temperature heat storage unit and the inert gas source, and wherein the control unit causes the flow path switching unit to switch the inert gas flow path system to any one of the first to fourth states based on at least either during a charging operation or during a power generation operation, and whether a first pressure which is a pressure of the gas phase portion of the high temperature heat storage unit is equal to or higher than a second pressure which is a pressure of the gas phase portion of the low temperature heat storage unit.

3. The compressed air energy storage power generation device according to claim 2, wherein a first mode in which inert gas consumption reduction is prioritized over power consumption reduction, and a second mode in which the power consumption reduction is prioritized over the inert gas consumption reduction are settable, when the first pressure is equal to or higher than the second pressure during the charging operation in the first mode, the control unit causes the flow path switching unit to set the inert gas flow path to the first state, when the first pressure is not equal to or higher than the second pressure during the charging operation in the first mode, the control unit causes the flow path switching unit to set the inert gas flow path to the second state, and during the charging operation in the second mode, the control unit causes the flow path switching unit to switch the inert gas flow path to the third state.

4. The compressed air energy storage power generation device according to claim 3, wherein when the first pressure is equal to or higher than the second pressure during the power generation operation in the first mode, the control unit causes the flow path switching unit to set the inert gas flow path to the second state, when the first pressure is not equal to or higher than the second pressure during the power generation operation in the first mode, the control unit causes the flow path switching unit to set the inert gas flow path to the first state, and during the power generation operation in the second mode, the control unit causes the flow path switching unit to switch the inert gas flow path to the fourth state.

5. The compressed air energy storage power generation device according to claim 2, wherein when the first pressure is equal to or higher than the second pressure during the charging operation, the control unit causes the flow path switching unit to switch the inert gas flow path to the first state, and when the first pressure is not equal to or higher than the second pressure, the control unit causes the flow path switching unit to switch the inert gas flow path to the second state.

6. The compressed air energy storage power generation device according to claim 2, wherein when the first pressure is equal to or higher than the second pressure during the power generation operation, the control unit causes the flow path switching unit to switch the inert gas flow path to the second state, and when the first pressure is not equal to or higher than the second pressure during the power generation operation, the control unit causes the flow path switching unit to switch the inert gas flow path to the first state.

7. A compressed air energy storage power generation method, comprising:

preparing a compressed air energy storage power generation device including an electric motor driven by fluctuating input power, a compressor that is mechanically connected to the electric motor and compresses air, an accumulator that is fluidly connected to the compressor and stores compressed air generated by the compressor, an expander that is fluidly connected to the accumulator and driven by the compressed air supplied from the accumulator, a generator that is mechanically connected to the expander, a first heat exchange unit that performs a heat exchange between the compressed air generated by the compressor and a heat medium to raise a temperature of the heat medium, a high temperature heat storage unit that is fluidly connected to the first heat exchange unit and stores the heat medium after the heat exchange in the first heat exchange unit, a second heat exchange unit that is fluidly connected to the high temperature heat storage unit and performs a heat exchange between the heat medium supplied from the high temperature heat storage unit and the compressed air supplied from the accumulator to the expander to raise a temperature of the compressed air, a low temperature heat storage unit that is fluidly connected to the second heat exchange unit and stores a heat medium after the heat exchange in the second heat exchange unit, an inert gas source that supplies an inert gas, an inert gas flow path system through which a gas phase portion of the high temperature heat storage unit, a gas phase portion of the low temperature heat storage unit, and the inert gas source are fluidly connected to each other, and a flow path switching unit that switches the inert gas flow path system to a communication state and a blocked state;

including a state of the inert gas flow path system that is switchable by the flow path switching unit, the state including a first state in which the high temperature heat storage unit and the low temperature heat storage unit communicate with each other, and the inert gas source is blocked from both the high temperature heat storage unit and the low temperature heat storage unit, a second state in which the high temperature heat storage unit and the low temperature heat storage unit are blocked from each other, and the inert gas source is blocked from both the high temperature heat storage unit and the low temperature heat storage unit, a third state in which the inert gas source is in communication with the low temperature heat storage unit, and the high temperature heat storage unit is blocked from the low temperature heat storage unit and the inert gas source, and a fourth state in which the inert gas source is in communication with the high temperature heat storage unit, and the low temperature heat storage unit is blocked from the high temperature heat storage unit and the inert gas source; and switching the inert gas flow path system to any one of the first to fourth states based on at least either during a charging operation or during a power generation operation, and whether a first pressure which is a pressure of the gas phase portion of the high temperature heat storage unit is equal to or higher than a second pressure which is a pressure of the gas phase portion of the low temperature heat storage unit.

* * * * *